(12) United States Patent
Meirick et al.

(10) Patent No.: US 8,130,074 B2
(45) Date of Patent: Mar. 6, 2012

(54) METHOD FOR DISCARDING ALL SEGMENTS CORRESPONDING TO SAME PACKET IN A BUFFER

(75) Inventors: Ingo Meirick, Herzogenrath (DE); Håkan Nordstrom, Sollentuna (SE); Erik Westerberg, Enskede (SE); Paul Schliwa-Bertling, Linköping (SE); Hannes Ekström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1240 days.

(21) Appl. No.: 10/571,606

(22) PCT Filed: Sep. 11, 2003

(86) PCT No.: PCT/SE03/01427
§ 371 (c)(1),
(2), (4) Date: Feb. 27, 2007

(87) PCT Pub. No.: WO2005/025151
PCT Pub. Date: Mar. 17, 2005

(65) Prior Publication Data
US 2007/0229214 A1 Oct. 4, 2007

(51) Int. Cl.
*H03K 17/00* (2006.01)

(52) U.S. Cl. ............ 340/2.23; 370/328

(58) Field of Classification Search .......... 370/352, 370/335, 353, 413, 389, 441, 354; 455/231, 455/343; 342/457; 340/991; 379/93
See application file for complete search history.

(56) References Cited

U.S. PATENT DOCUMENTS

| 5,751,970 | A * | 5/1998 | Bournas | 709/236 |
|---|---|---|---|---|
| 6,480,489 | B1 * | 11/2002 | Muller et al. | 370/389 |
| 6,567,378 | B1 * | 5/2003 | Yuan et al. | 370/235 |
| 6,711,126 | B1 * | 3/2004 | Besset-Bathias | 370/229 |
| 7,073,196 | B1 * | 7/2006 | Dowd et al. | 726/14 |
| 7,450,601 | B2 * | 11/2008 | Sundqvist et al. | 370/412 |
| 2001/0036154 | A1 * | 11/2001 | Takagi | 370/229 |

(Continued)

FOREIGN PATENT DOCUMENTS

EP  1 100 285 A1  5/2001

(Continued)

OTHER PUBLICATIONS

International Search Report of PCT/SE2003/001427, mailed Mar. 16, 2004.

(Continued)

*Primary Examiner* — Nick Corsaro
*Assistant Examiner* — Mahendra Patel
(74) *Attorney, Agent, or Firm* — Nixon & Vanderhye P.C.

(57) ABSTRACT

The technology described relates to management of data packets and buffers comprising segments of data packets in a mobile communication system. Information associated with data packet segments is analyzed by a Base Station System (BSS) housing a data buffer. Based on this information analysis, the BSS can identify those segments in the buffer that constitute a complete data packet. Once identified, the segments can be discarded from the buffer. The information can include size information, whereby the analysis comprises pairwise comparing the size of a current segment with the size of a next consecutive segment. This size comparison enables identification of a first segment and a last segment of the complete data packet. The information could also, or alternatively, include a notification provided in the header of the segment. This notification identifies the associated segment as the first or last segment of the data packet or an intermediate segment.

29 Claims, 14 Drawing Sheets

U.S. PATENT DOCUMENTS

Figure 1:
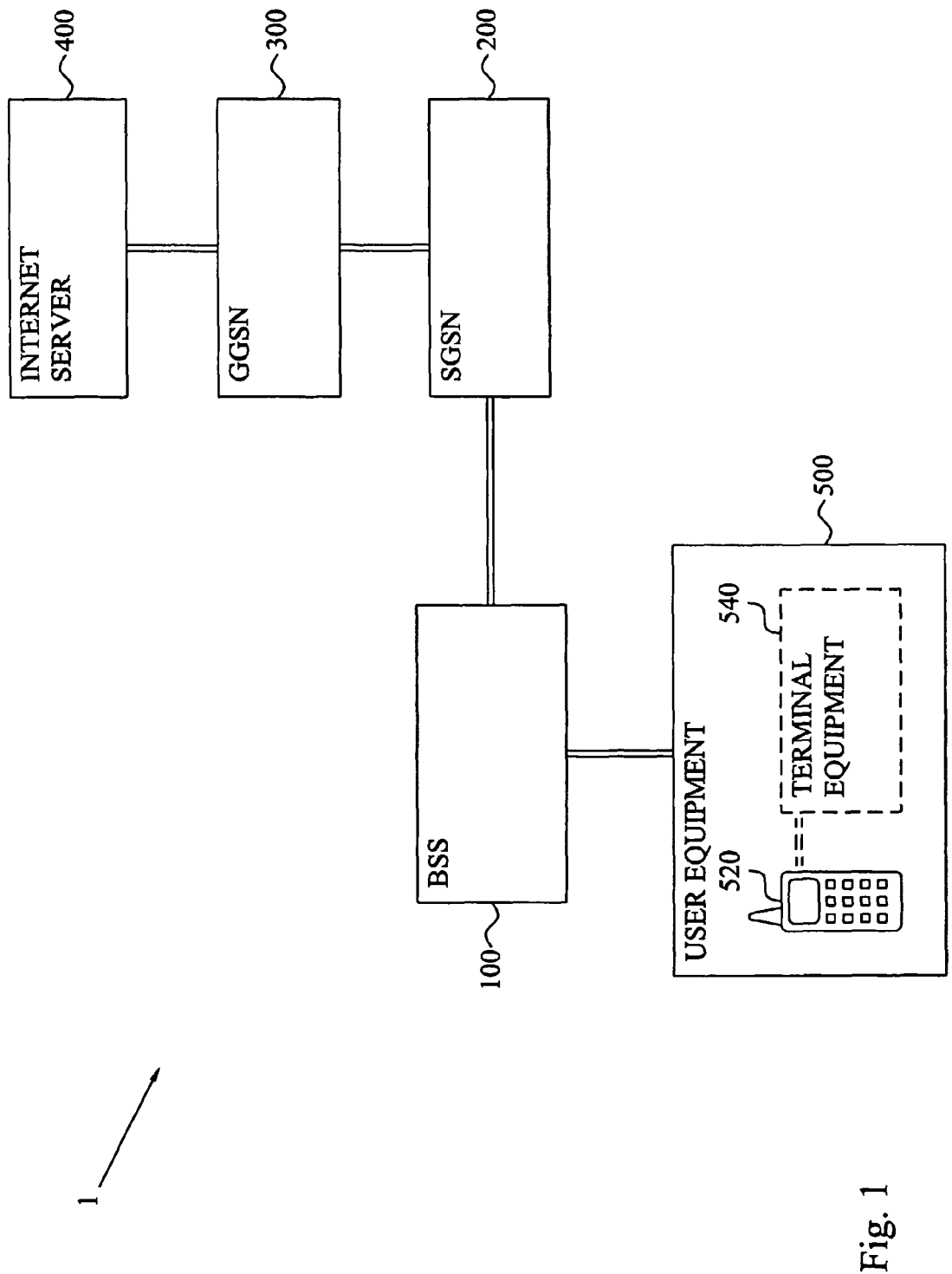

| | | | |
|---|---|---|---|
| 2002/0068588 A1* | 6/2002 | Yoshida et al. | 455/461 |
| 2003/0076850 A1* | 4/2003 | Jason, Jr. | 370/414 |
| 2003/0202500 A1* | 10/2003 | Ha et al. | 370/342 |
| 2004/0109465 A1* | 6/2004 | Kim et al. | 370/419 |
| 2005/0207437 A1* | 9/2005 | Spitzer | 370/412 |
| 2007/0229214 A1* | 10/2007 | Meirick et al. | 340/2.23 |
| 2007/0288824 A1* | 12/2007 | Yeo et al. | 714/749 |
| 2008/0084822 A1* | 4/2008 | Sagfors et al. | 370/235 |

FOREIGN PATENT DOCUMENTS

| | | |
|---|---|---|
| JP | 2000-13390 | 1/2000 |
| JP | 2001-57556 | 2/2001 |
| WO | 01/93598 A2 | 12/2001 |

OTHER PUBLICATIONS

Database WPI, Week 200128, Derwent Publications Ltd., AN 2001-27444.

Database WPI, Week 200030, Derwent Publications Ltd., AN 2001-153479.

3GPP TS 04.64 V8.7.0 (Dec. 2001), p. 1-61.

3GPP TS 04.65 V8.2.0 (Sep. 2001), p. 1-44.

3GPP TS 23.060 V6.1.0 (Jun. 2003), p. 1-208.

English translation of Chinese official action, May 25, 2011, in corresponding Chinese Application No. 03827050.1.

* cited by examiner

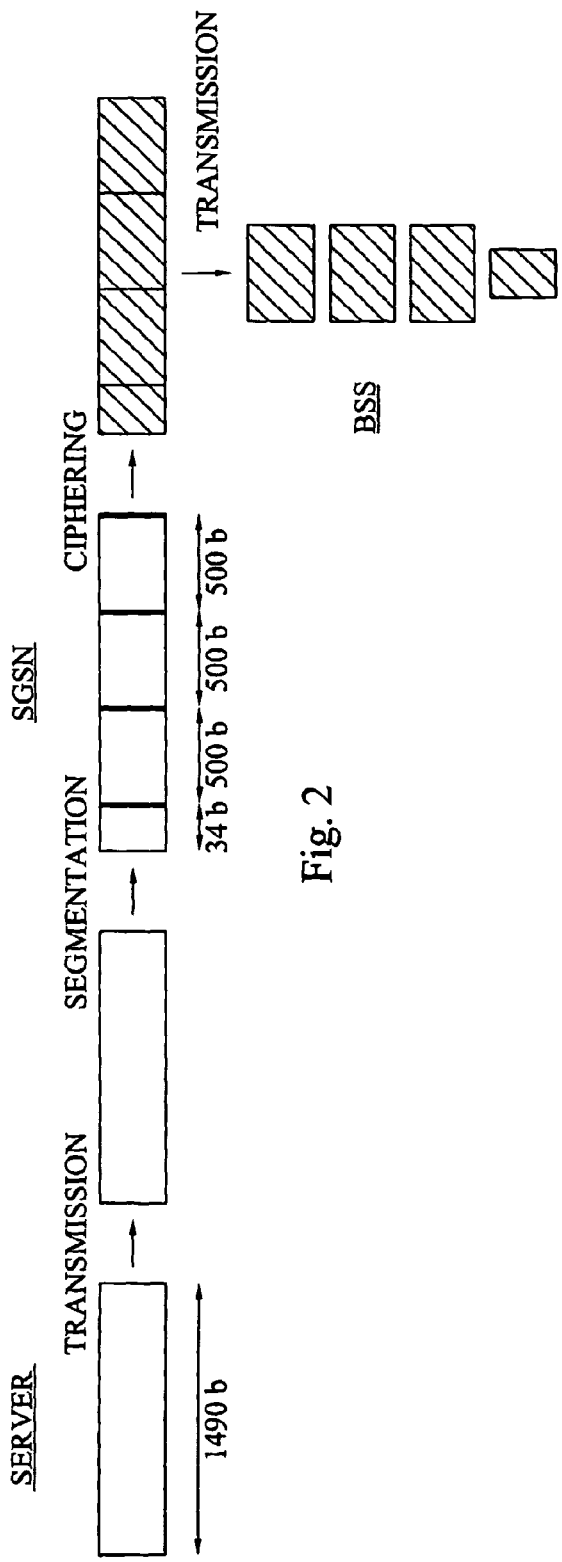
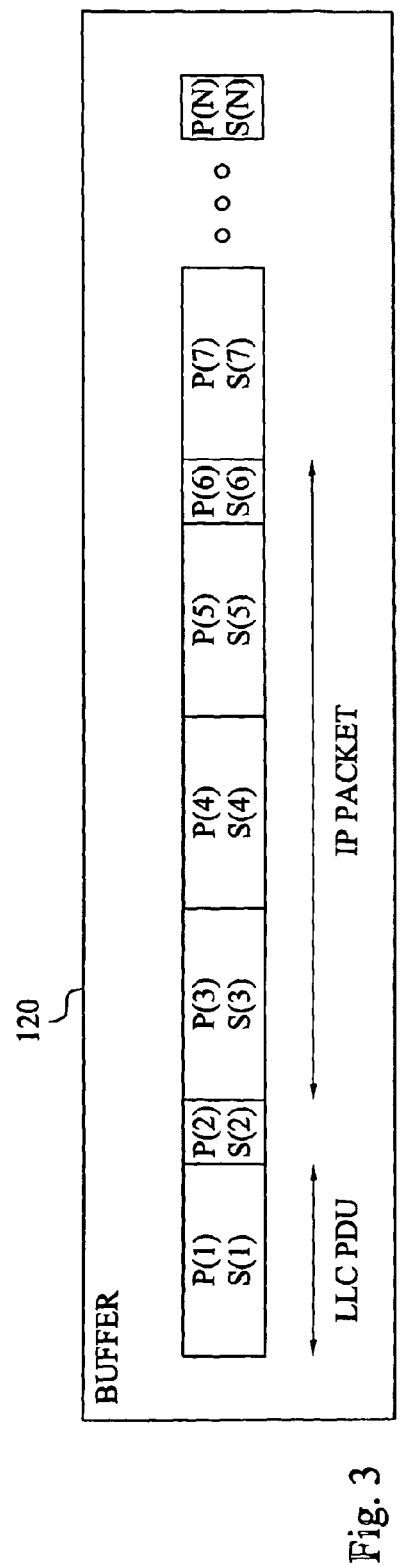

METHOD FOR DISCARDING ALL SEGMENTS CORRESPONDING TO SAME PACKET IN A BUFFER

This application is the US national phase of international application PCT/SE2003/001427, filed 11 Sep. 2003, which designated the U.S. the entire content of which is hereby incorporated by reference.

TECHNICAL FIELD

The technical field generally refers to management of data packets, and in particular to management of data packet buffers in mobile communications systems.

BACKGROUND

In mobile communications system of today there is an increasing trend of using mobile user equipment, units and telephones for other services than the traditional call and voice services. For example, a user can by means of his/her mobile telephone or associated terminal equipment, e.g. laptop or Personal Digital Assistance (FDA), access the Internet and download Web pages to the mobile user equipment. Furthermore, picture, audio, video and other data files can be transmitted between different mobile units, ordered from content or service providers and/or downloaded from Web pages. This increase in transmission of data packets and, in particular, Internet Protocol (IP) packets in the mobile communications systems, puts high demands on the processing of data packets throughout the communications system for guaranteeing satisfactory performance in terms of download times, low delay times, etc.

One way of increasing the performance of data packet transmission and processing and, thus, providing satisfactory download times for data packets in IP/Transmission Control Protocol (TCP) related mobile systems, such as General Packet Radio Service (GPRS), Enhanced GPRS (EGPRS) and Enhanced Data rates for Global Evolution (EDGE)/GPRS systems, is to provide efficient management of the data buffers that, temporarily, stores the data packets during their transmission throughout the system. In particular, the way data packets are discarded from data buffers that starts to fill up significantly impacts the end to end performance of the system.

In the prior art GPRS, EGPRS and EDGE/GPRS systems, IP packets are segmented in a Serving GPRS Support Node (SGSN) into a number of data packet segments or Logical Link Control (LLC) Packet Data Units (PDUs) before transmission to the Base Station System (BSS) and, eventually, to the relevant mobile user equipment. Due to the segmentation of IP packets, the BSS has no way of identifying those segments (LLC PDUs) in its associated data buffer that constitute a complete IP packet and, thus, cannot perform an efficient buffer management. Such a solution results in a far from satisfactory data buffer management, leading to unnecessary long download times of Web pages, files, pictures, audio, video and any other data reception that uses TCP/IP. In addition, the existing solution makes the mobile communications system sensitive to TCP/IP related parameter settings, including the employed TCP window size.

SUMMARY

The technology in this case overcomes these and other drawbacks of the prior art arrangements.

It is a general object to provide efficient management of data packets in a data buffer comprising segments of data packets.

It is another object to enable identification of a complete data packet in a data buffer comprising segments of data packets.

It is a particular object is to provide efficient management of data buffers comprising segments of data packets in a base station system of a mobile communications system.

Briefly, the technology in this case involves management of data packets in a data buffer comprising segments of data packets and, in particular, identification of complete data packets in such a buffer. The technology further relates to managing data buffers comprising segments of data packets in a mobile communications system and, in particular, to discarding identified complete data packets from such data buffers.

A base station system (BSS) receives data packet segments from a network node that segments data packets into smaller segments before transmission to the BSS. In the BSS, the data packet segments enter a data buffer queue, where they are, temporarily, stored before forwarding to a mobile user equipment. When the buffer starts to fill up, segments have to be discarded therefrom. Segments are efficiently discarded by enabling identification of those segments that together constitute a complete data packet and then discards the identified complete data packet.

The data packet identification is realized by the BSS analyzing information associated with the data packet segments. In a first embodiment, the information comprises the size of individual segments. By pairwise comparing the size of a data packet segment with the size of a next consecutive segment in the buffer queue, the complete IP packet can be identified. The size comparison includes providing and associating a segment counter k with a current data packet segment $P(k)$. If the size $S(k)$ of this segment $P(k)$ currently associated with counter k is smaller than the size $S(k+1)$ of a next consecutive segment $P(k+1)$, this next segment $P(k+1)$ is identified as the first segment of a complete data packet and is associated with a FIRST identifier. However, if the size $S(k)$ is not smaller than the size $S(k+1)$, the counter now becomes associated with the next segment. The size comparison and stepwise (segment by segment) counter association is continued until two neighboring segments are found where the size $S(k)$ of the previous segment $P(k)$ is smaller than the size $S(k+1)$ of the consecutive segment $P(k+1)$, or until the end of the buffer queue is reached.

Once the first segment of the complete data packet is found in the buffer, the search for the last segment of the complete data packet is started. The segment counter k is now associated with the identified first segment of the complete data packet. The size $S(k)$ of this current segment $P(k)$ is then compared with the size $S(k+1)$ of a next consecutive segment $P(k+1)$ in the buffer. As long as the two sizes $S(k)$, $S(k+1)$ are equal the counter is stepwise increased, thus, travelling segment by segment through the buffer and comparing the size of pairs of segments until the sizes differ, or the end of the buffer queue is reached. If the sizes $S(k)$, $S(k+1)$ differ, the next segment $P(k+1)$ is identified as the last segment of the complete data packet and is associated with a LAST identifier. Thus, the complete data packet is identified as comprising the data packet segment associated with the FIRST identifier, the segment associated with the LAST identifier and any intermediate segments in the buffer. Once this complete data packet is identified in the buffer, the BSS can discard it therefrom.

In a second example embodiment the BSS receives the information from the network node performing the data packet segmentation. The information is then associated with the segments, e.g. by being provided in the information field of the header of the data packet segments. The information includes a notification whether the associated segment is the first segment of the complete data packet, the last segment of the complete data packet and/or an intermediate segment. The BSS then retrieves the information from the header of the segments in the buffer, when it is time to discard a data packet, and, thus, can identify and discard those segments that constitute a complete data packet.

In a preferred example embodiment, the data packet is an Internet Protocol (IP) packet provided from an Internet server, content or service provider or mobile user equipment in a General Packer Radio Service (GPRS), Enhanced GPRS (EGPRS), Enhanced Data rates for Global Evolution (EDGE)/GPRS communications system. Typically, the IP packet is transmitted to a Gateway GPRS Support Node (GGSN), which forwards it to a Serving GPRS Support Node (SGSN). If the size of the received IP packet is larger than a size threshold value, the SGSN segments the IP packet into a number of Logical Link Control (LLC) Packet Data Units (PDUs). The provided LLC PDUs may then optionally be ciphered before they are sent in sequence order to the BSS.

The information included in the header of the LLC PDU (data packet segment) by the SGSN may include format or type information, identifying the format of the payload of the associated LLC PDU. This format information is then extracted by the BSS and allows discrimination between LLC PDU containing the IP packet payload from different control messages and packets transmitted from the SGSN to the BSS.

Verification that the data packet segments (LLC PDUs) identified as constituting a complete (IP) data packet actually comprises IP packet payload could, alternatively, be performed by comparing the total size of the identified segments with size threshold values. Since the size of IP packets typically significantly differs from the size of other packets and messages, such as Transmission Control Protocol (TCP) control messages, the BSS can verify that the identified segments actually contain IP packet payload.

The technology in this case offers the following example advantages:
  Enables efficient data buffer management in mobile communications system, which increases the data packet and buffer processing performance;
  Enables decreased download times of Web pages, files, pictures, audio, video and other data reception that uses TCP/IP;
  Stabilizes the mobile communications system towards different TCP/IP related parameter settings, including TCP window size;
  Reduces complexity and cost of optimizing mobile communications system with respect to TCP/IP transfer; and
  Provides re-use of buffer management techniques from fixed-line Internet applications in mobile communications system.

Other advantages will be appreciated upon reading of the description.

SHORT DESCRIPTION OF THE DRAWINGS

Figure 5:
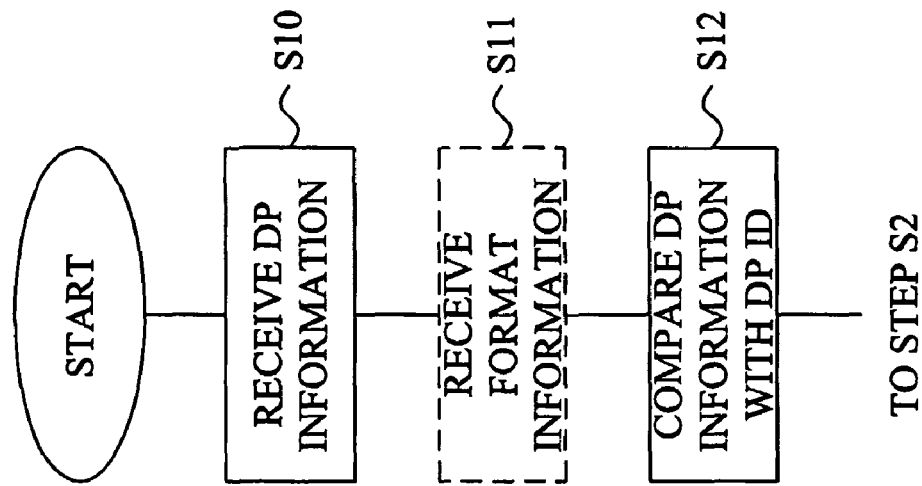
Figure 4:
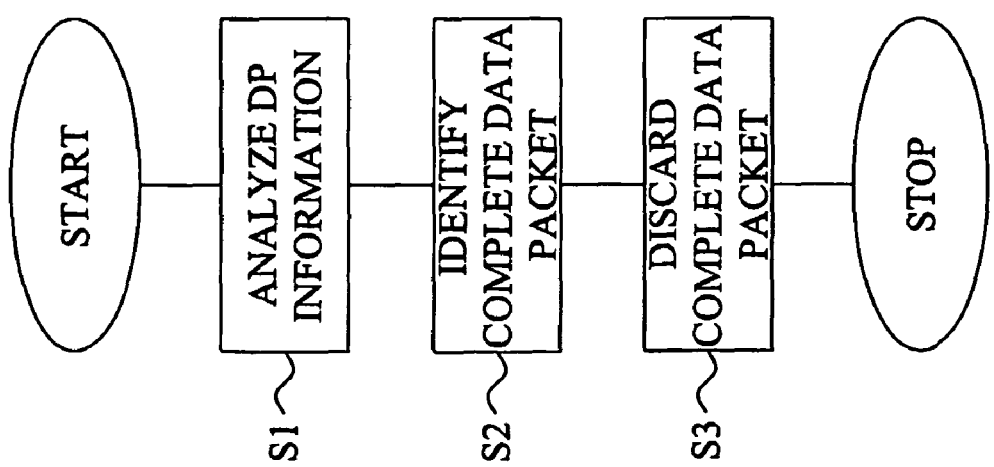
Figure 7:
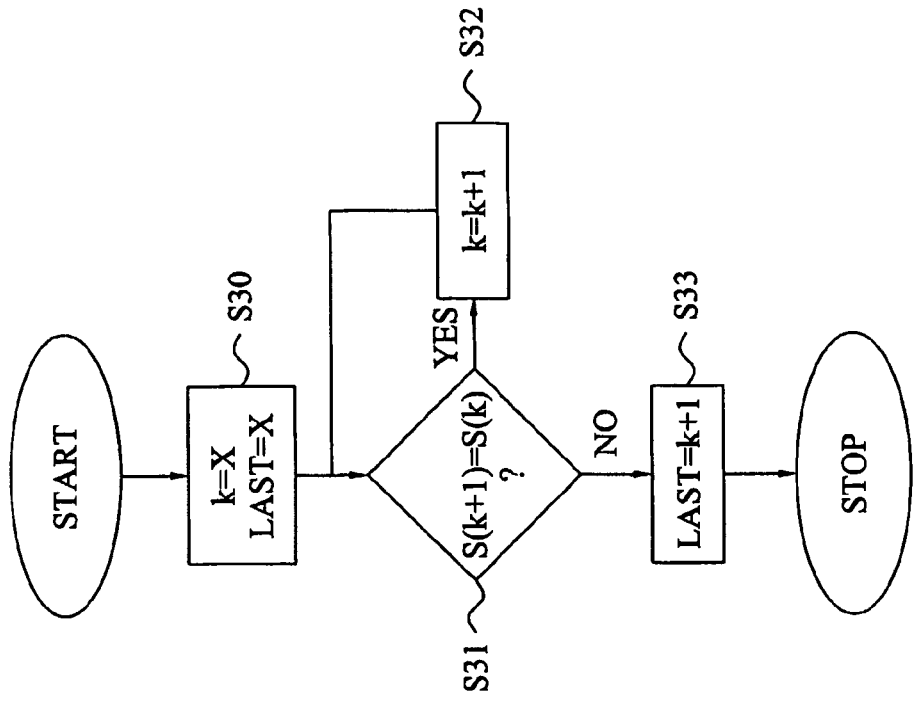
Figure 6:
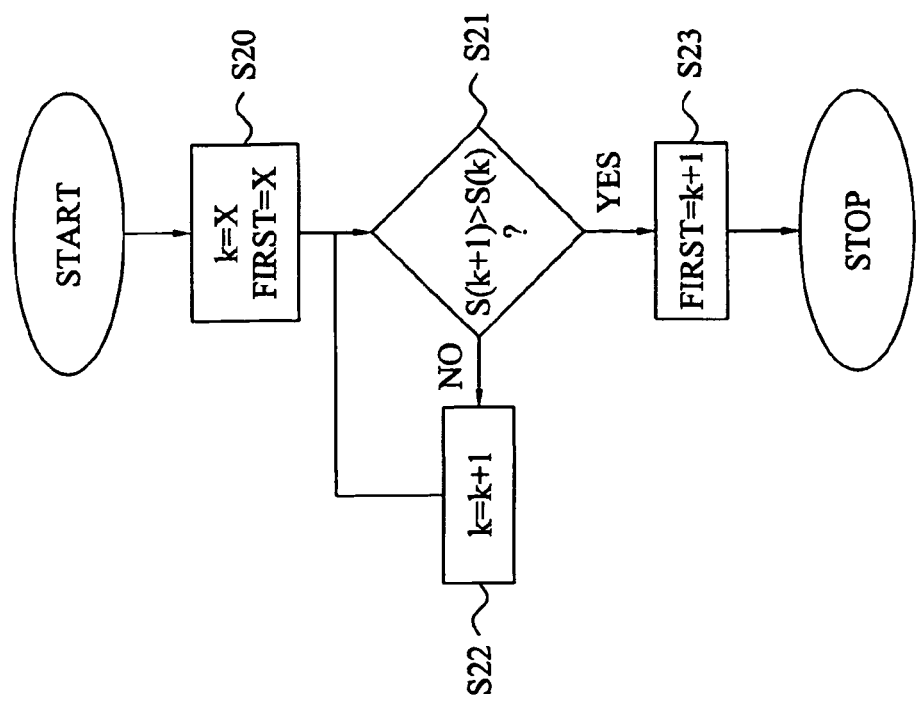
Figure 8:
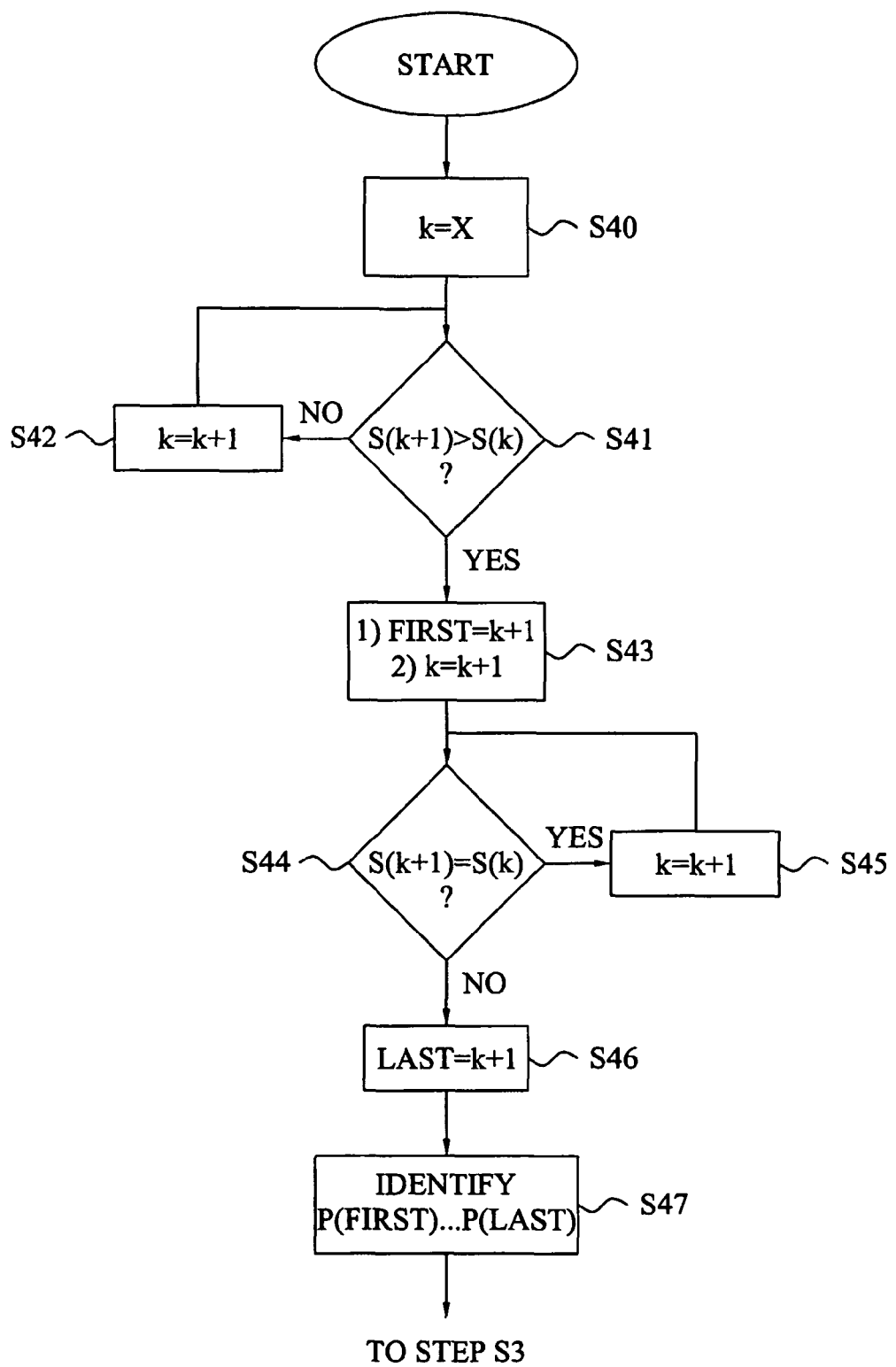
Figure 9:
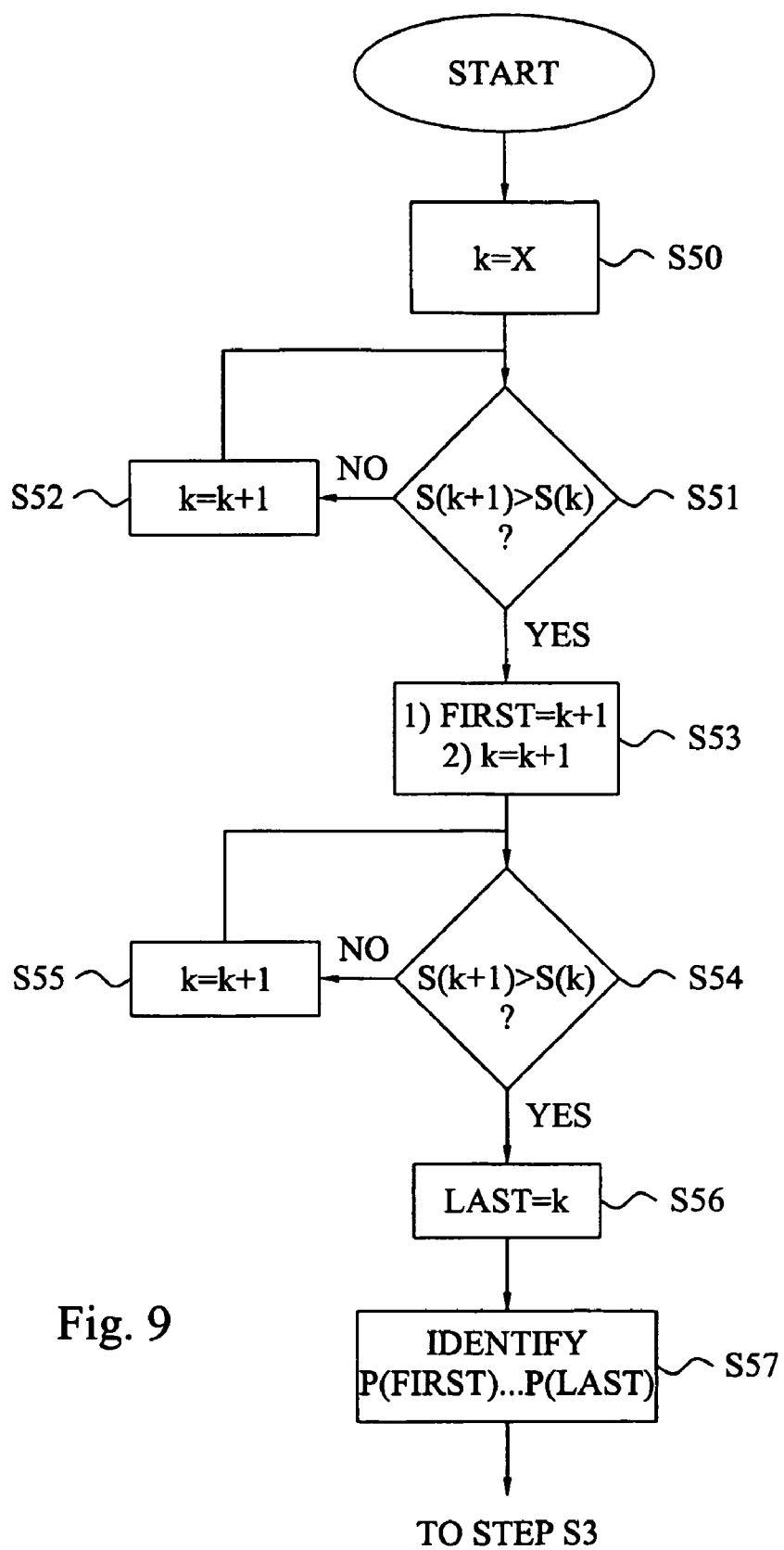
Figure 10:
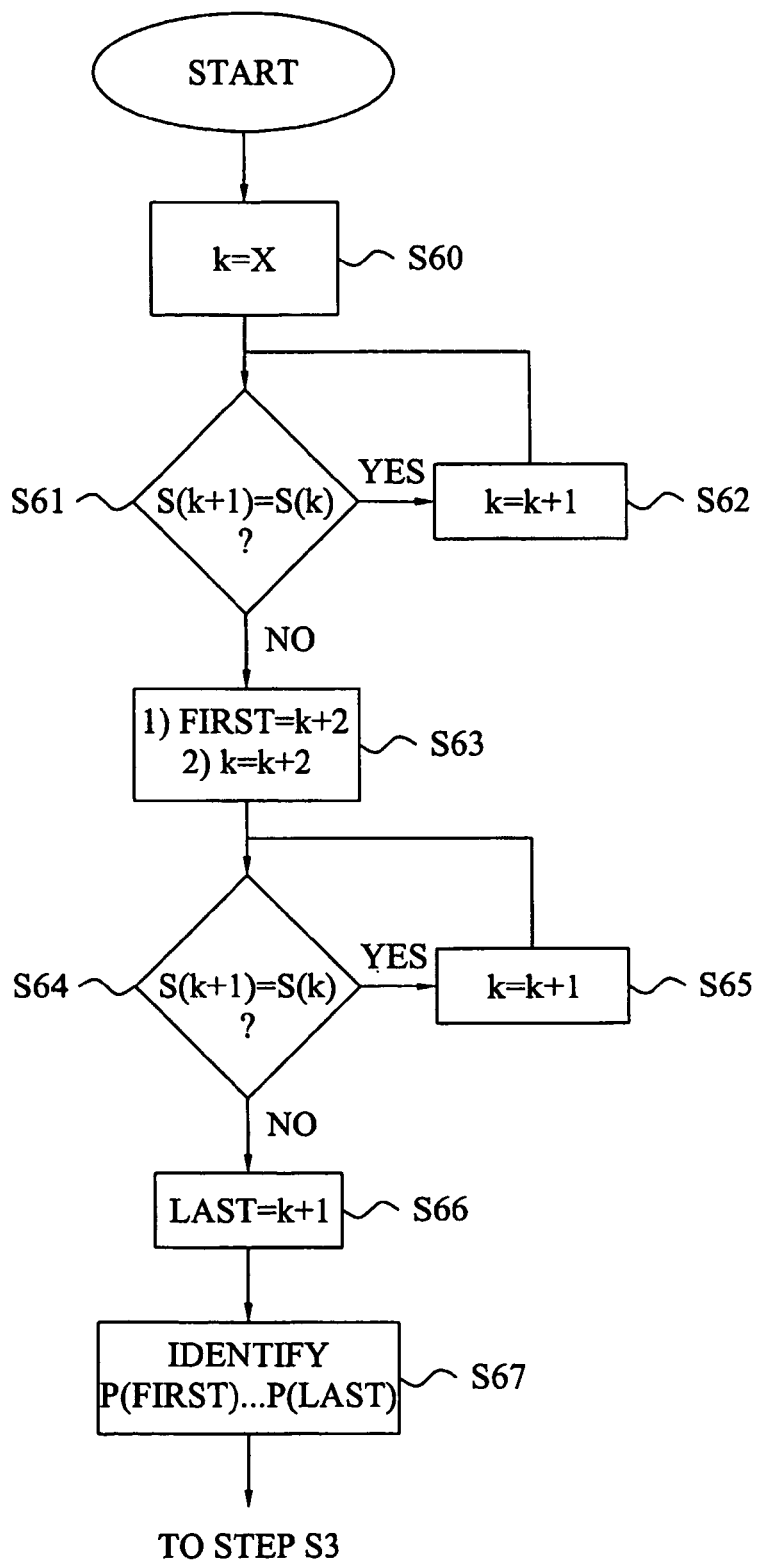
Figure 11A:
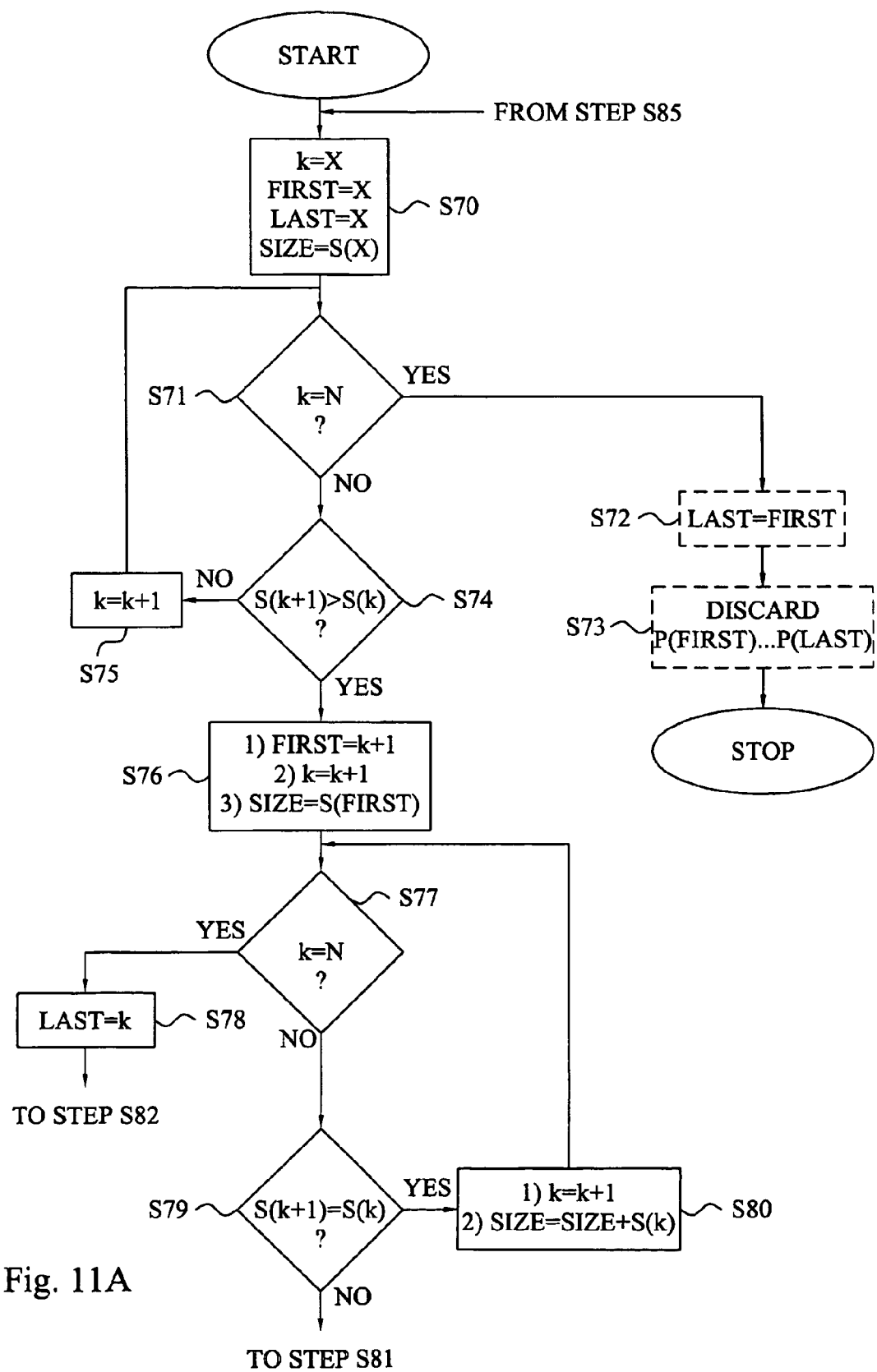
Figure 17:
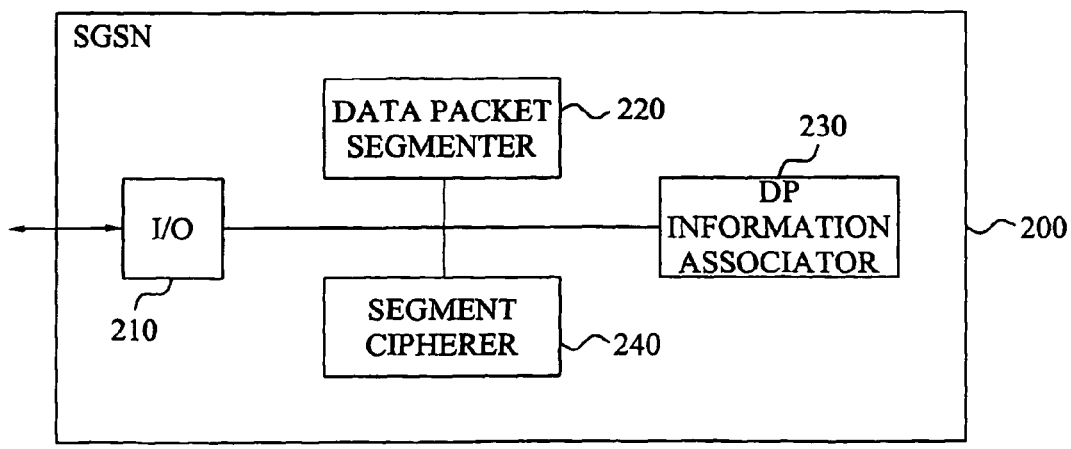
Figure 12A:
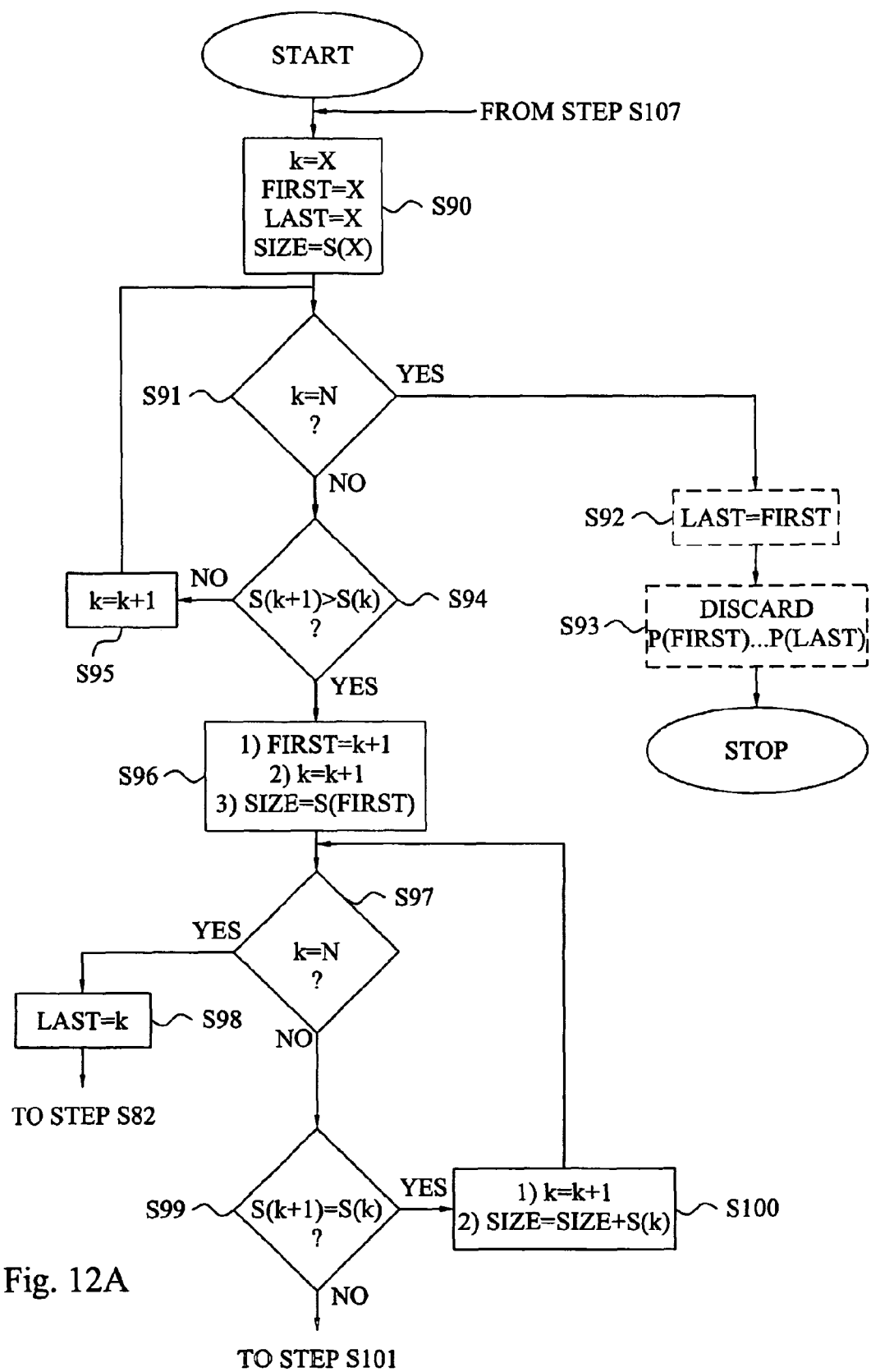
Figure 12B:
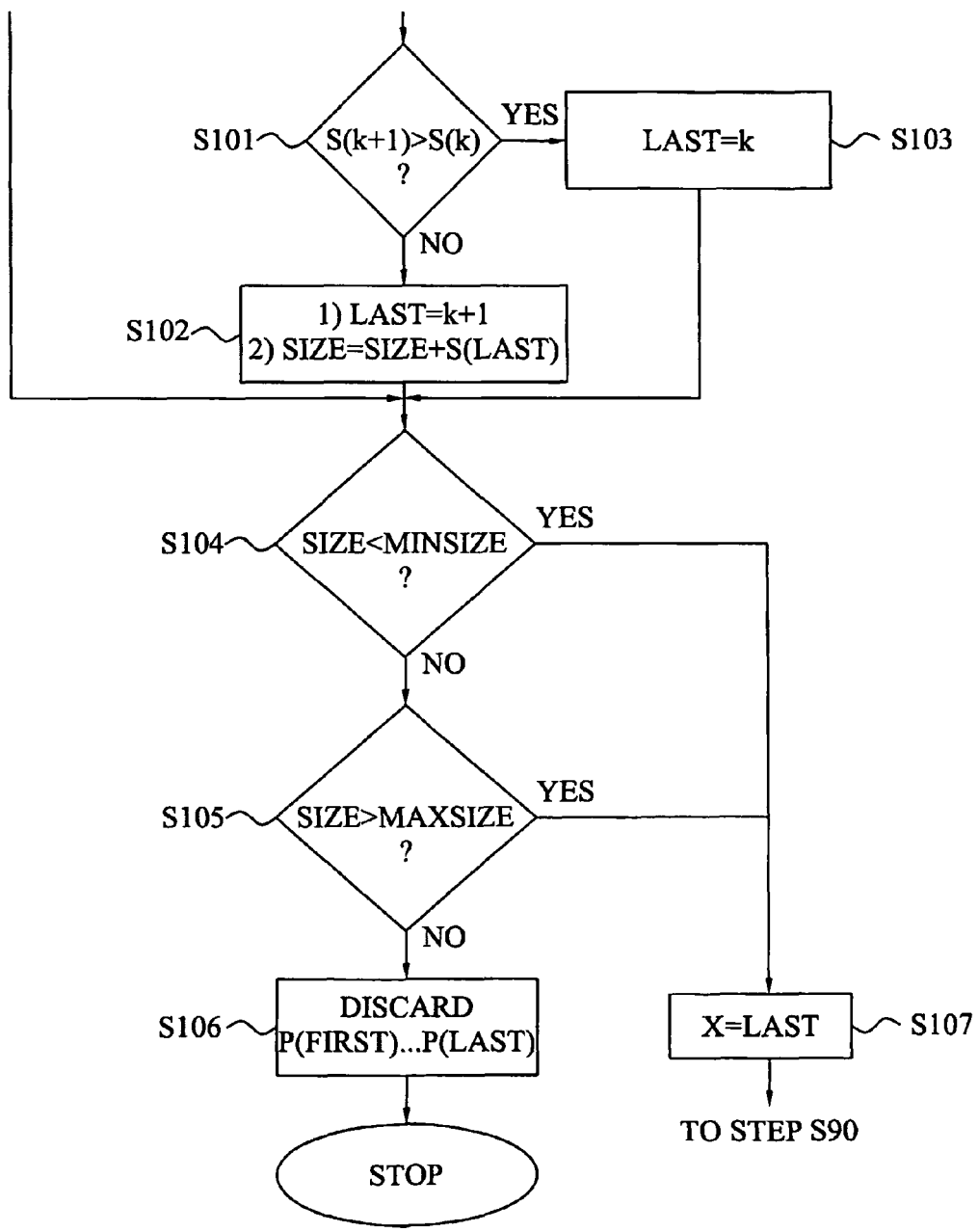
Figure 13A:
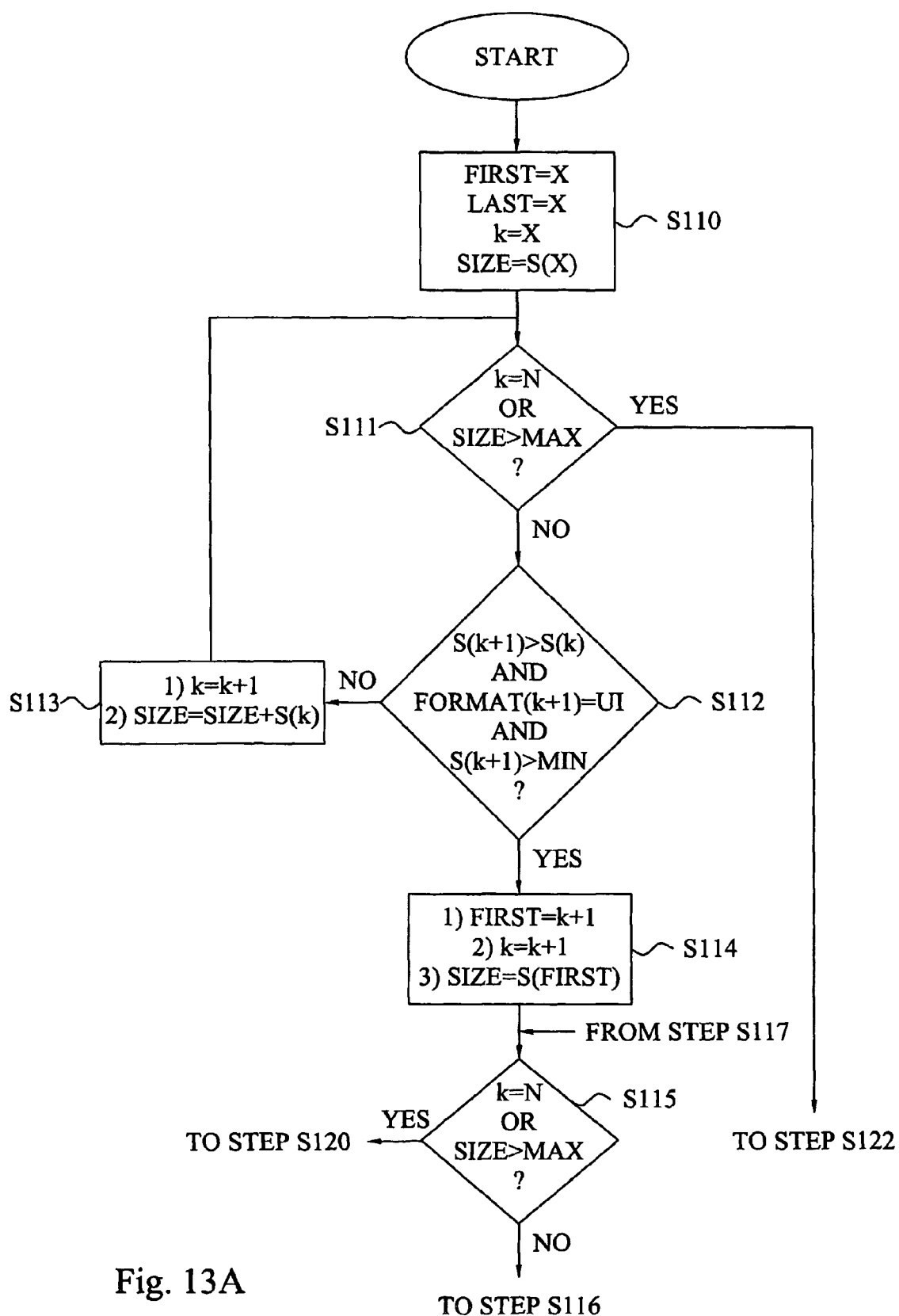
Figure 13B:
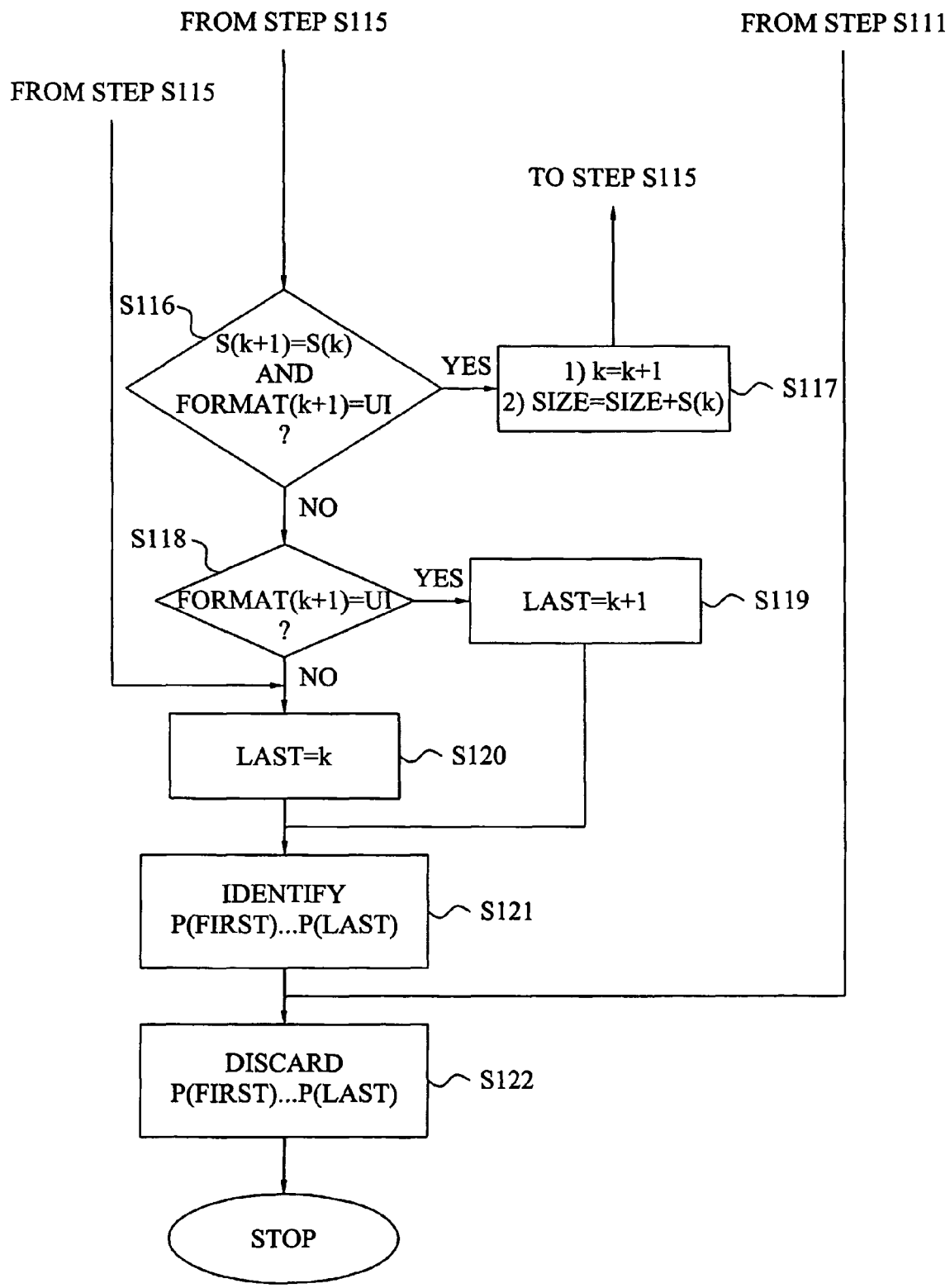
Figure 14:
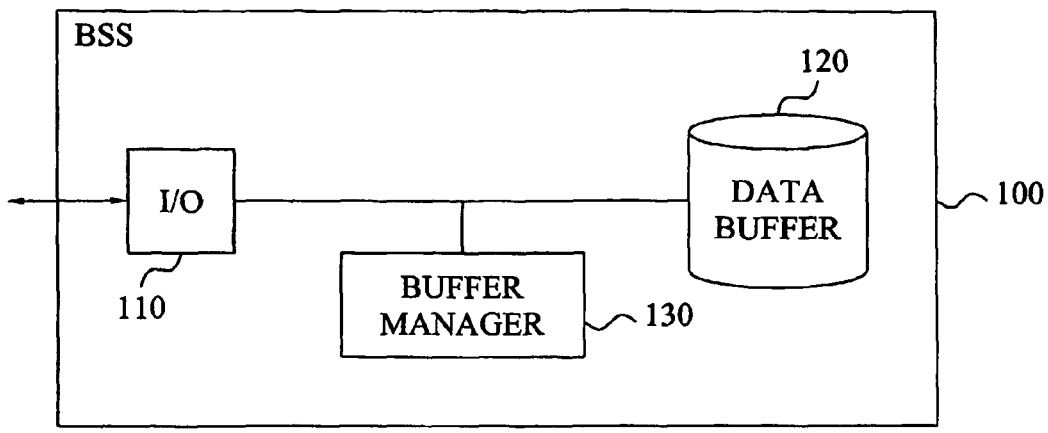
Figure 15:
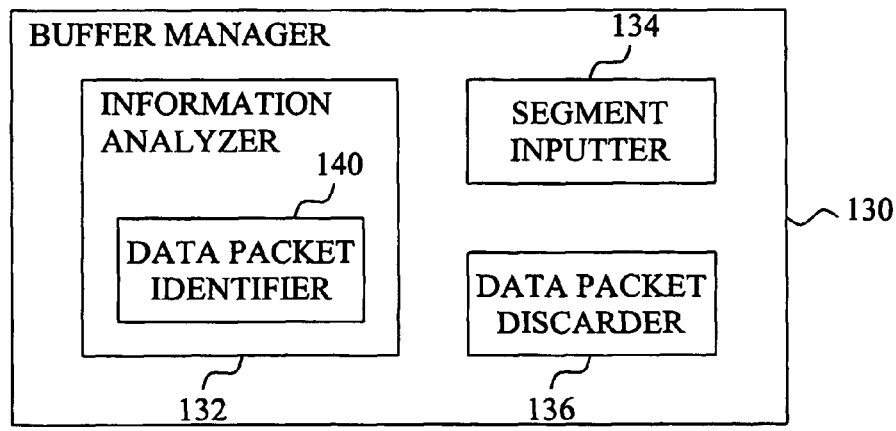
Figure 16:
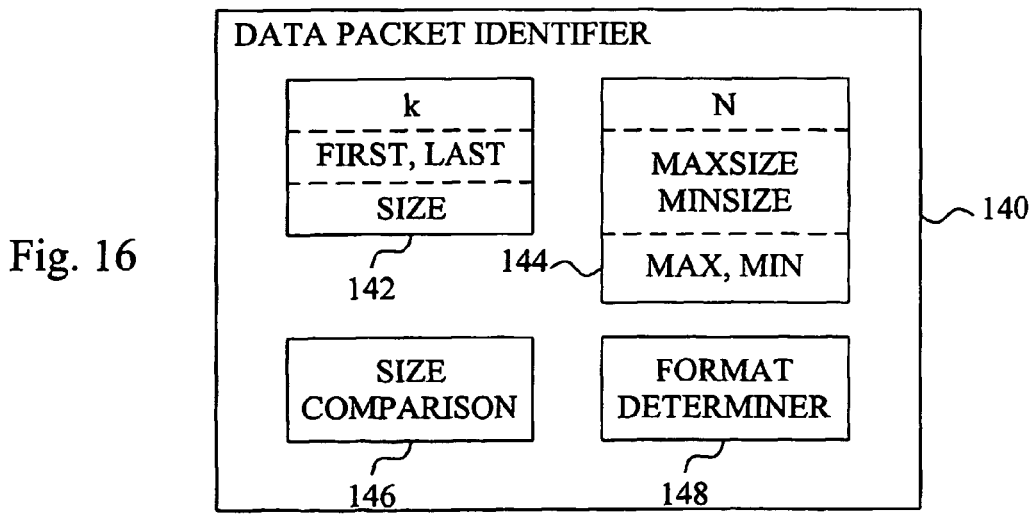

FIG. 1 is an overview of a communications;
FIG. 2 schematically illustrates processing of a data packet in the communications system of FIG. 1;
FIG. 3 is a block diagram of a data buffer;
FIG. 4 is a flow diagram illustrating an example embodiment of a method of managing a data buffer;
FIG. 5 is a flow diagram illustrating an example embodiment of the analyzing step of FIG. 4 in more detail;
FIG. 6 is a flow diagram illustrating an example embodiment of a method of identifying a first data packet segment of a complete data packet in a data buffer;
FIG. 7 is a flow diagram illustrating an example embodiment of a method of identifying a last data packet segment of a complete data packet in a data buffer;
FIG. 8 is a flow diagram illustrating an example embodiment of a method of identifying a complete data packet in a data buffer;
FIG. 9 is a flow diagram illustrating another example embodiment of a method of identifying a complete data packet in a data buffer;
FIG. 10 is a flow diagram illustrating a further embodiment of a method of identifying a complete data packet in a data buffer;
FIGS. 11A and B are flow diagrams illustrating another embodiment of a method of managing a data buffer;
FIGS. 12A and B are flow diagrams illustrating a further embodiment of a method of managing a data buffer;
FIGS. 13A and B are flow diagrams illustrating yet another embodiment of a method of managing a data buffer;
FIG. 14 is a block diagram schematically illustrating an embodiment of a base station system;
FIG. 15 is a block diagram schematically illustrating an embodiment of a data buffer manager;
FIG. 16 is a block diagram schematically illustrating an embodiment of a data packet identifier; and
FIG. 17 is a block diagram schematically illustrating an embodiment of a data packet segmenting network node.

DETAILED DESCRIPTION

Throughout the drawings, the same reference characters will be used for corresponding or similar elements.

The technology in this case generally relates to management of data packets and in particular to management of data buffers comprising segments of data packets in a mobile communications system. The also provides methods and systems for enabling identification of a complete data packet in such segment-comprising data buffers.

In order to facilitate understanding, an example of a communications system 1, to which the teachingscan be applied, is first discussed with reference to FIG. 1.

The communications system 1 as illustrated in FIG. 1 is instantiated by a General Packet Radio Service (GPRS) communications system. However, as the person skilled in the art understands the technology is not limited thereto but can be applied to other mobile communications system supporting transmission of data packets, in particular Transmission Control Protocol (TCP)/Internet Protocol (IP) supporting systems, including, but not limited to, GPRS, Enhanced GPRS (EGPRS) and Enhanced Data rates for Global Evolution (EDGE)/GPRS systems. Below the structure and segmentation processes are described in terms of the GPRS system 1. The structure and segmentation processes for the EGPRS and EDGE/GPRS systems are very similar and anyone skilled in the art should be able to understand how the description and principles below are generalized to such systems.

The GPRS system 1 includes of a number of different system or network nodes, which are further described in [1]. Following the notation of [1], the relevant nodes are Gateway GPRS Support Node (GGSN) 300, Serving GPRS Support Node (SGSN) 200 and Base Station System (BSS) 200. The system 1 provides services to user equipment 500 connected or associated thereto. The user equipment 500 is typically a stand-alone mobile station or telephone 520, Personal Digital Assistant (PDA), etc. In another embodiment, the user equipment 500 comprises a mobile station 520 connected or associated with terminal equipment 540. This terminal equipment 540 is typically a laptop, a PDA or a separate logical entity of the mobile station 520 itself. One purpose of the GPRS system is to route data packets (IP packets) that enter the GPRS system, e.g. from an Internet server 400, to the correct user equipment 500.

The data packet could include data of a Web page, file, picture, audio, video or any other data that a user wants to receive in his/her mobile station 520 or terminal equipment 540. This data is provided from a content or service provider, exemplified by an Internet server 400 in FIG. 1, or from another user equipment to the mobile user equipment 500 in form of data packets and data packet segments, which is discussed in more detail below. In particular, the technology is well applied to data that uses TCP/IP for data reception and transmission.

In the following a data packet will be exemplified by an IP packet and a segment of such an IP packet will be exemplified by a Logical Link Control (LLC) Packet Data Unit (PDU). However the technology is not limited to this example of data packet and data packet segment.

An IP packet enters the GPRS system, typically, at the Gi interface between an Internet server 400 or other service or packet provider, and the GGSN 300. The size of the IP packet is regulated by the Internet Engineering Task Force (IETF) specifications and depends, among others, on the type of application, client (user equipment) and server preferences. Based on GGSN internal information combined with information in the IP packet itself, the GGSN 300 routes the IP packet to the SGSN 200. The transport of IP packets from the SGSN 200 to the user equipment 500 uses the LLC protocol, defined in e.g. [2]. An LLC PDU consists of a header portion and a payload portion. The IP packets are transported in the payload portion. In any specific transfer from the SGSN 200 to user equipment 500 there is a maximum size of the LLC PDUs. This size is, typically, negotiated between the user equipment 500 and the SGSN 200 and can differ from one user equipment—SGSN combination to another. However, within one user equipment—SGSN flow the negotiated maximum size is preferably fixed. The currently largest possible value for the maximum size of the LLC PDU is 1500 bytes, but a significantly lower maximum value is generally used by many mobile stations and other mobile user equipment. The negotiated maximum allowed size of the LLC PDUs is not known in the BSS 100. As was mentioned above, in addition to the payload field the LLC PDU comprises 11 bytes of headers. This means that the maximum number of IP octets that an LLC PDU can transfer is 11 bytes less than the negotiated maximum size of the LLC PDUs.

The 3GPP specifications [1], [2] and [3] specify that if the size of the IP packet plus 11 bytes is smaller than or equal to the negotiated maximum allowed size of the LLC PDU then that IP packet shall be transported in one LLC PDU. Furthermore, the payload field of that LLC PDU shall preferably contain nothing less and nothing more than that IP packet. In this case there is a one-to-one relation between the LLC PDU and the corresponding IP packet.

In contrast, if the IP packet is larger than the maximum size of the LLC PDU minus 11 bytes then the IP packet preferably shall be segmented and transported in more than one LLC PDU. According to the 3GPP specifications, the segmentation is to be such that the LLC PDUs containing segments of one particular IP packet are sent in sequence with sequential numbering P, P+1 . . . P+N. The segmentation is further such that all but LLC PDU P+N is of the allowed maximum size. This is further illustrated in FIG. 2.

FIG. 2 schematically illustrates the processing of an IP data packet in the GPRS system of FIG. 1. In this example the size of the IP packet is 1490 bytes. With reference to both FIG. 1 and FIG. 2, firstly the relevant IP packet is transmitted from the Internet server 400 or some other data provider via the GGSN 300 to the SGSN 200. In this example the maximum size of the LLC PDU (data packet segment) is negotiated to 500 bytes. Since the total size of the IP packet exceeds the maximum segment size of 500 bytes the SGSN 200 has to segment the received IP packet into a number of LLC PDUs. The first LLC PDU comprises bytes 1-489 of the IP packet in addition to the 11 bytes header. The second LLC PDU comprises bytes 490-978 and the third LLC PDU includes bytes 979-1467. The fourth and last LLC PDU includes the remaining bytes 1468-1490 of the IP packet. Thus, with the size parameters above, the received IP packet is segmented into four consecutive LLC PDUs, where the first three is of maximum segment size.

In the next step there is an option for the SGSN 200 to cipher or encrypt the generated LLC PDU(s). After ciphering the only information available to anyone not in possession of the ciphering or decryption key(s) is the size of the LLC PDU.

The (possibly ciphered) LLC PDU(s) each containing either complete or portions of IP packets are then transmitted to the BSS 100 for further delivery across the radio interface to the user equipment 500. In the BSS 100, the LLC PDUs, typically, are entered in a data buffer or other data packet storage unit, where they may be queued, prioritized, delayed and even discarded. The LLC PDUs not discarded are eventually transmitted across the radio interface to the appropriate user equipment. In the user equipment the possibly segmented IP packets are retrieved from the LLC PDUs and possible decrypted. The IP packets that have been segmented are reassembled.

FIG. 3 is a block diagram of a data buffer 120 comprising segments (LLC PDUs) of complete data packets (IP packets) in the BSS of the communications system of FIG. 1. The buffer 120 comprises a queue of consecutive LLC PDUs. Each LLC PDU has a certain size S(1) to S(N) for LLC PDU P(1) to P(N). In the buffer 120 of FIG. 3, LLC PDU P(3) to P(6) together constitute a complete IP packet and the total number of LLC PDUs in the buffer is N. The data buffer 120 preferably comprises LLC PDUs of or destined to a single user. This user typically has a service agreement. e.g. subscription, with a network operator managing the communications system housing the BSS and the buffer 120. Such subscription is typically manifested in a Subscriber Identify Module (SIM) that is arranged in or associated with the user equipment.

FIG. 4 illustrates a flow diagram of an example embodiment of managing a data buffer, such as buffer 120 of FIG. 3, in a BSS of a mobile communications system. The method starts by the BSS analyzing data packet (DP) information associated with LLC PDUs (data packet segments) in its associated buffer in step S1. In a first example embodiment the DP information comprises information included in the header of the LLC PDUs and in a second example embodiment the DP information includes the size of the LLC PDUs. In step S2, the BSS then identifies a complete IP packet in the buffer based on the analyzed DP information. In other words, the BSS identifies the LLC PDU or those LLC PDUs that together includes all the data (bytes) of a complete IP packet before it was segmented. Once a complete IP packet is identified, the BSS discards this complete IP packet from the buffer in step S3. In an alternative example embodiment, instead of discarding an identified IP packet from the buffer, the BSS could delay or prioritize transmission thereof to the user equipment, queue the complete IP packet, or perform some other processing thereof.

Thus, the technology here provides an intelligent and advantageous way of managing data buffers and discarding IP packets. It has proven both from theory and experience that the best practice of managing a buffer of data packet segments (LLC PDUs) that starts to fill up is to discard exactly one data packet UP packet), i.e. not a fraction (segment) of a data packet nor two or more consecutive data packets. In particular, the level of TCP signaling in the communications system housing the BSS and its associated data buffer significantly improves when one complete IP packets are discarded. Furthermore, by discarding complete IP packets in the buffer of the BSS, IP packets are discarded closest to the bottleneck of the communications system. Different versions of Active Queue Management (AQM) known in the art may be used for determining when and, possibly, which complete data packet, if several in the buffer, should be discarded.

FIG. 5 is a flow diagram illustrating an embodiment of the analyzing step of FIG. 4 in more detail. In step S10, the BSS receives the DP information from the network node that performed the segmentation of IP packets into LLC PDUs, i.e. the SGSN of FIG. 1. The DP information is associated with a LLC PDU and is preferably included in an information field of the header of the LLC PDU, such as in the information field of a BSS GPRS Protocol (BSSGP) PDU including the associated LLC PDU. The DP information could comprise information that identifies the associated LLC PDU as the last segment of a complete IP packet, i.e. as comprising the last remaining bytes of the IP packet. In another embodiment the DP information could comprise information that identifies the associated LLC PDU as the first segment of a complete IP packet, i.e. as comprising the first (maximum segment size—header size) bytes of the IP packet. Also information identifying an associated LLC PDU as an intermediate LLC PDU could comprise DP information.

In the optional step S11, the BSS receives type or format information associated with the LLC PDU. This information enables the BSS to identify the type of data included in the LLC PDU, and thus allows discrimination between IP payload data and other data, e.g. Voice over IP (VoIP) and different control signal packets and messages, such as TCP messages. The BSS then compares the received DP information (and possibly format information) with DP identifiers (format identifiers) for determining if the associated LLC PDU is the first, last or an intermediate segment of the IP packet in step S12. Generally, this comparison is performed by comparing the received DP information with bite sequence that have previously been determined as identifiers for the first, last or intermediate LLC PDUs. The method then continues to step S2, where the BSS identifies a complete IP packet based on the DP information associated with LLC PDUs. If the DP information, includes both a first DP identifier and a last DP identifier, the BSS identifies the complete IP packet as comprising the payload of the LLC PDU being associated with the first DP identifier, the payload of the LLC PDU being associated with the last DP identifier and the payload of any LLC PDUs positioned between these two LLC PDUs in the data buffer. However, if the DP information only includes a last DP identifier, a complete IP packet could be identified as including the payload of the LLC PDUs ranging from a next consecutive LLC PDU after a first LLC PDU being associated with the last DP identifier to a second LLC PDU being associated with the last DP identifier. Similarly, if the DP information only includes a first DP identifier, a complete IP packet could be identified as including the payload of the LLC PDUs from a first LLC PDU being associated with the first DP identifier to a neighboring preceding LLC PDU of a second LLC PDU being associated with the first DP identifier.

Alternatively to receiving DP information enabling the BSS to identify a complete IP in its buffer of consecutive LLC PDUs, the BSS can generate this DP information itself.

FIG. 6 illustrates an embodiment of a method of identifying a first LLC PDU of a complete IP packet in a data buffer comprising LLC PDUs. This method could be performed by the BSS for enabling efficient management of its buffer and for discarding complete IP packets therefrom.

The method starts in step S20, where a segment counter or pointer k is provided and associated with one of the LLC PDUs in the buffer. In the figure, the counter k is associated with LLC PDU number X (P(X)). X can be an arbitrary number from 1 to N, where N is the total number of LLC PDUs in the data buffer queue. However, in most applications X is 1, i.e. the method starts with the first LLC PDU in the buffer, or at least one of the few first LLC PDUs in the buffer. Where in the buffer queue the search for the complete data packet is started could be determined by an AQM protocol. Furthermore, an identifier or pointer FIRST of the first LLC PDU of a complete IP packet is provided and associated with the same LLC PDU P(X) as the segment counter k.

In the next step S21, the size S(k) of the LLC PDU P(k) currently associated with the counter k is compared to the corresponding size S(k+1) of the next consecutive LLC PDU P(k+1) in the buffer queue. If the size S(k+1) of this next LLC PDU P(k+1) exceeds the size S(k) of the current LLC PDU P(k), the method continues to step 23 where the FIRST identifier is associated with this next LLC PDU P(k+1). Thus, this next LLC PDU P(k+1) is, through the association with the identifier FIRST, identified as the first LLC PDU of a complete IP packet. The method then ends.

However, if the size S(k+1) of the next LLC PDU P(k+1) does not exceed the size S(k) of the current LLC PDU S(k), the segment counter k is increased by one in step S22, thus enabling checking the next LLC PDU. The method now continues to step S21, where the size comparison is repeated until the size S(k+1) of the next LLC PDU P(k+1) exceeds the size S(k) of the LLC PDU P(k) currently being associated with the counter k. In other words, by employing the loop comprising step S21 and S22 the method stepwise (segment by segment) goes through the LLC PDUs in the buffer starting from LLC PDU number X and comparing the size of two neighboring LLC PDUs until the first LLC PDU of a complete IP packet is identified (or the end of the buffer is reached).

As an alternative to the size condition in the comparison step S21 (S(k+1)>S(k)), the size condition and comparison S(k+1)=S(k) could be performed. Then, if the two sizes S(k), S(k+1) are equal the segment counter k is increased in step S22. However, if S(k+1) differs from S(k), the method continues to step S23 where the FIRST identifier is associated with LLC PDU P(k+2), i.e. with the data packet segment P(k+2) found two positions after the current segment P(k) in the buffer queue. Furthermore, in another embodiment of the size comparison step S21, the size condition S(k+1)<S(k) is used. If the size S(k+1) of the next LLC PDU P(k+1) is equal or larger than the size S(k) of the current LLC PDU P(k), the segment counter k is increased in step S22. However, if S(k+1) is smaller than S(k), the FIRST identifier is associated with the LLC PDU P(k+2) found two positions after the current LLC PDU P(k) in the buffer in step S23.

The method of FIG. 6 will now, as an example, be applied to the buffer of FIG. 3. In this example X is chosen to be 1, i.e. the investigation is started from the first LLC PDU P(1) in the buffer.

In step S20 the segment counter k is set to 1 and is, thus, associated with the LLC PDU P(1). The identifier FIRST is also associated with this segment P(1). The size S(1) of LLC PDU P(1) is then compared to the size S(2) of the next (second) LLC PDU P(2). Since the size S(2) of the second LLC PDU P(2) is smaller than the size S(1), the method continues to step S22, where the counter k is increased from 1 to 2. In other words, the counter k is now associated with the second LLC PDU P(2) in the buffer. The size S(2) is compared to the corresponding size S(3) of the third LLC PDU P(3) in the buffer in step S21. In this case, the size S(3) is larger than the size S(2) so the condition of step S21 is fulfilled and the method proceeds to step S23. In this step S23, the identifier FIRST is set to be equal to k+1, in this case 3. Thus, the identifier FIRST is associated with the third LLC PDU P(3) of the buffer, which now is identified as the first LLC PDU of a complete IP packet.

FIG. 7 illustrates an embodiment of a method of identifying a last LLC PDU of a complete IP packet in a data buffer comprising LLC PDUs. This method could be performed by the BSS for enabling efficient management of its buffer and for discarding complete IP packets therefrom.

The method starts in step S30, where a segment counter or pointer k is provided and associated with one of the LLC PDUs in the buffer. In the figure, the counter k is associated with LLC PDU number X (P(X)). X can be an arbitrary number from 1 to N, where N is the total number of LLC PDUs in the data buffer queue. However, in most applications the last segment identifying method of FIG. 7 is preferably used in combination of the method of FIG. 6 identifying the first LLC PDU of a complete IP packet. In such a case, X is preferably equal to FIRST, i.e. the method starts with the first LLC PDU of a complete IP packet in the buffer as identified using the method of FIG. 6 or identified in some other way, e.g. by means of DP information received from the SGSN. Furthermore, an identifier or pointer LAST of the last LLC PDU of a complete IP packet is provided and associated with the same LLC PDU P(X) as the segment counter k.

Correspondingly to step S21 of FIG. 6, a size comparison using the size S(k) of the LLC PDU P(k) currently associated with the counter k and the size S(k+1) of a next consecutive LLC PDU P(k+1) in the buffer queue is performed in step S31. If the two sizes S(k), S(k+1) differ the method continues to step S33, where the identifier LAST is set to k+1, i.e. being associated with the next LLC PDU P(k+1). Thus, this LLC PDU P(k+1) is identified as the last LLC PDU of a complete IP packet and the method ends.

However, if the two sizes S(k), S(k+1) are equal, as determined in step S31, the method continues to step S32 where the segment counter k is increased by one. The counter k is now associated with the next LLC PDU in the buffer. The steps S31 and S32 are repeated until the size of two neighboring LLC PDUs differ and, thus, the last LLC PDU of a complete IP packet is identified (or the end of the buffer is reached).

As an alternative to the size condition in the comparison step S31 (S(k+1)=S(k)), the size condition and comparison S(k+1)<S(k) could be performed. Then, if the size S(k+1) of the next consecutive LLC PDU P(k+1) is smaller than the size S(k) of the current LLC PDU P(k), the method continues to step S33, otherwise step S32 is performed. In another embodiment of the size comparison step S31, the size condition S(k+1)>S(k) is used. In such a case, if the size S(k+1) of the next LLC PDU P(k+1) is equal to or smaller than the size S(k) of the current LLC PDU P(k) the segment counter k is increased in step S32, otherwise the LAST identifier is associated with the current LLC PDU P(k) in step S33.

The method of FIG. 7 will now, as an example, be applied to the buffer of FIG. 3. In this example X is chosen to be 3 (FIRST), i.e. the investigation is started from the first LLC PDU P(3) of the complete IP packet in the buffer.

In step S30 the segment counter k is set to 3 and is, thus, associated with the LLC PDU P(3). The identifier LAST is also associated with this segment P(3). The size S(3) of LLC PDU P(3) is then compared to the size S(4) of the next (fourth) LLC PDU P(4). Since the two sizes S(3) and S(4) are equal the method continues to step S32, where the counter k is increased by one and is now associated with the fourth LLC PDU P(4). The size comparison of step S31 is repeated but now segment size S(4) and S(5) are compared. The segment sizes are equal and step S32 is anew performed, increasing the counter k to 5. In step S31, the size S(5) is compared to the size S(6) of the sixth LLC PDU P(6). In this case, S(6) is smaller than S(5) and the size condition of step S31 is not fulfilled so the method proceeds to step S33. The identifier LAST is now set equal to k+1, i.e. 6, and, thus, is associated with the sixth LLC PDU P(6). This LLC PDU P(6) is identified as the last LLC PDU of the complete IP packet and the method ends.

In order to identify a complete IP packet in a buffer, both the first and last LLC PDU have to be identified (or the first (last) LLC PDU of a first complete IP packet in combination with the first (last) LLC PDU of a second consecutive complete IP packet). FIG. 8 is an illustration of an embodiment of a method of identifying a complete IP packet in a data buffer comprising LLC PDU segments. This embodiment is basically a combination of the first segment identifying method of FIG. 6 and the last segment identifying method of FIG. 7.

The method starts in step S40, where a segment counter or pointer k is provided and associated with a LLC PDU P(X) in the data buffer. As was discussed above, this LLC PDU P(X) may be an arbitrary LLC PDU, e.g. selected by an associated AQM unit, but is preferably selected from the first few LLC PDUs, such as the first LLC PDU in the buffer (X=1). In the next step S41, it is investigates whether this is the first LLC PDU of a complete IP packet. This investigation is performed by comparing the size S(k) of the LLC PDU P(k) currently associated with the counter k with the size S(k+1) of a next consecutive LLC PDU P(k+1). If the size S(k+1) is larger than the size S(k) the method continues to step S43, otherwise the segment counter is stepwise (segment by segment) increased in step S42 until the size condition of step S41 is fulfilled. In step S43, an identifier FIRST of the first LLC PDU of a complete IP packet is set to k+1, i.e. being associated with LLC PDU P(k+1). The counter k is then increased by one. Step S44 then investigates whether the LLC PDU is an intermediate LLC PDU or a last LLC PDU of the complete IP packet by performing a size comparison. In step S44, if the size S(k) of the current LLC PDU P(k) differs from the size S(k+1) of a next consecutive LLC PDU P(k+1), the method continues to step S46. Otherwise, the counter k is "segmentwise" increased by one in step S45, until the last LLC PDU of a complete IP packet is identified. An identifier LAST of the last LLC PDU of a complete IP packet is then set to k+1, i.e. being associated with LLC PDU P(k+1), in step S46. Thereafter, in step S47, the complete IP packet in the data buffer is identified as comprising the LLC PDU P(FIRST) associated with the identifier FIRST, the LLC PDU P(LAST) associated with the identifier LAST and any intermediate LLC PDUs positioned between these two LLC PDUs (P(FIRST) and P(LAST)) in the buffer queue.

The above-identified method of FIG. 8 could be performed as a sub method of the data buffer management method of FIG. 4. In such a case, the DP information could comprise the identifier or pointer FIRST and LAST enabling identification of the complete IP packet. The method then continues from step S47 to step S3 of FIG. 4, where the now identified complete IP packet is discarded.

The method of FIG. 8 will now, as an example, be applied to the buffer of FIG. 3. In this example X is chosen to be 1, i.e. the investigation is started from the first LLC PDU P(1) in the buffer.

In step S40 the segment counter k is set to 1 and is, thus, associated with the LLC PDU P(1). The size S(1) of LLC PDU P(1) is then compared to the size S(2) of the next (second) LLC PDU P(2). Since the size S(2) is smaller than the size S(1), the method continues to step S42, where the counter k is increased from 1 to 2. The size S(2) is then compared to the corresponding size S(3) of the third LLC PDU P(3) in the buffer in step S41. In this case, the size S(3) is larger than the size S(2) so the condition of step S41 is fulfilled and the method continues to step S43. In this step S43, the identifier FIRST is set to be equal to k+1, in this case 3. Thus, the third LLC PDU P(3) of the buffer is identified as the first LLC PDU of a complete IP packet. In addition, the counter is increased from 2 to 3. Size S(4) and S(3) are compared in step S44 and since the condition is fulfilled the counter k is increased by one reaching 4 in step S45. Correspondingly, size S(5) and S(4) and size S(6) and S(5) are compared in step S44, respectively. S(6) is smaller than S(5) and the loop of step S44 and S45 is exited and step S46 is entered, where the identifier LAST is set to 6. Finally, in step S47 the complete IP packet is identified as comprising (the payload of) LLC PDU P(3), P(4), P(5) and P(6).

FIG. 9 is an illustration of another embodiment of a method of identifying a complete IP packet in a data buffer comprising LLC PDU segments. This embodiment is basically a combination of two consecutive first segment identifying methods of FIG. 6.

The steps S50 to S53 corresponds to S40 to S43 in FIG. 8 and are not further discussed. In step S54 a size comparison by means of the segment sizes S(k) and S(k+1) of two neighboring LLC PDUs P(k), P(k+1) is performed. The segment counter k is increased by one in step S55, thus stepwise "jumping" from one LLC PDU to the next LLC PDU through the buffer, until the size S(k) of the LLC PDU P(k) currently associated with the counter k is smaller then the size S(k+1) of a next consecutive LLC PDU P(k+1). In step S56, the last LLC PDU of the complete IP packet is identified as LLC PDU P(k) and identifier LAST is set to the value of k. The next step S57 corresponds to step S47 of FIG. 8

FIG. 10 is an illustration of a further embodiment of a method of identifying a complete IP packet in a data buffer comprising LLC PDU segments. This embodiment is basically a combination of two consecutive last segment identifying methods of FIG. 7.

Step S60 corresponds to step S40 of FIG. 8 and is not further discussed. The size comparison of step S61 and the stepwise (segment by segment) increase of the segment counter k in step S62 is repeated until the size S(k) of the LLC PDU P(k) currently associated with the counter k differs from the corresponding size S(k+1) of a next consecutive LLC PDU P(k+1). If the sizes differ, identifier FIRST is set to k+2, i.e. the LLC PDU P(k+2) is identified as the first LLC PDU of the complete IP packet. Thereafter the segment counter k is increased by 2. The remaining steps S64 to S67 of the method correspond to the steps S44 to S47 of FIG. 8.

The first segment identifying method of FIG. 6 or the last segment identifying method of FIG. 7 could, alternatively, be combined with reception of DP information (FIG. 5) identifying the last LLC PDU of the complete IP packet or the first LLC PDU of the IP packet, respectively. The IP packet identification is then performed based both on DP information received from the SGSN and on information obtained through segment size comparisons.

FIGS. 11A and B are flow diagrams of an embodiment of a method of managing a data buffer comprising segments (LLC PDUs) of data packets (IP packets). In FIGS. 11A and B, a parameter N corresponds to the total number of LLC PDUs in the buffer queue. A parameter MINSIZE is the minimum size of an IP packet and a parameter MAXSIZE is the maximum size of an IP packet that is to be discarded from the buffer. These size thresholds are employed for discriminating between IP packets and other packets that should not be discarded. Such other packets and messages generally have a size that significantly differs from a typical size of an IP packet. One example of a data packet that should not be discarded from the buffer is TCP control messages or packets, such as synchronize (SYN) and SYN acknowledgement (ACK) control messages. Such messages are typically significantly smaller than IP packets and generally have a size smaller than 100 bytes. By then setting MINSIZE equal to 100, such TCP control messages/packets are protected from being discarded. As was mentioned in the foregoing, the maximum size of an IP packet is regulated by the IETF specifications and depends on the type of application, client, server preferences, etc.

The method starts in step S70, where a segment counter k is provided and associated with a LLC PDU P(X) in the buffer. Correspondingly, identifiers FIRST and LAST are associated with this LLC PDU P(X). A size parameter SIZE is set to the value of the segment size S(X) of this LLC PDU P(X). In step S71, it is investigated, by comparing the counter k with the total number N of LLC PDUs in the buffer, whether we currently are looking at the last LLC PDU P(N) of the buffer queue. If the current LLC PDU P(k) is the last LLC PDU P(N) of the buffer the method continues to the optional step S72, where the identifier LAST is set equal to the identifier FIRST, i.e. they are associated with one and the same LLC PDU. The method then moves to the optional step S73, where the LLC PDU associated with the FIRST and LAST identifier is discarded. The method then ends.

However, if the current LLC PDU P(k) is not the last one, its size S(k) is compared to the size S(k+1) of a next consecutive LLC PDU P(k+1) in step S74. If the size S(k+1) is larger than the size S(k) the method continues to step S76, otherwise the counter k is increased by one in step S75. The loop of step S71, S74 and S75 is then repeated until the first LLC PDU of the complete IP packet is identified as determined when S(k+1) is larger than S(k), as determined in step S74, or the end of the buffer queue is reached, as determined in step S71. In step S76, identifier FIRST is then associated with the identified first LLC PDU P(k+1) of the complete IP packet, i.e. set to k+1. The counter k is then increased by one and the parameter SIZE is set to the value of the size S(FIRST) of this first LLC PDU.

Thereafter, step S77 investigates if the segment counter k is equal to N. i.e. if the current LLC PDU P(k) is the last LLC PDU P(N) in the buffer. If k is equal to N, the identifier LAST is set to the value of the counter k, i.e. being associated with the current LLC PDU P(k), in step S78. The method then continues to step S82. If the current LLC PDU P(k) is not the last LLC PDU P(N) of the buffer, steps S77, S79 and S80 are repeated until the last LLC PDU of the complete IP packet is identified or the end of the buffer is reached. Step S79 determines whether the size S(k) of the current LLC PDU P(k) is equal to the size S(k+1) of a next consecutive LLC PDU P(k+1) in the buffer queue. If the sizes S(k), S(k+1) are equal the counter k is increased by one in step S80. Thereafter, the size S(k) (which corresponds to S(k+1) in the previous step S79) is added to the SIZE parameter. Once S(k+1) differs from S(k) the method continues from step S79 to step S81.

In step S81, the identifier LAST is set to k+1 and, thus, is associated with the now identified last LLC PDU of the complete IP packet. In addition, the size S(LAST) of this identified LLC PDU P(LAST) is added to the SIZE parameter. The SIZE parameter is compared to the MINSIZE threshold value in step S82 and to the MAXSIZE threshold value in step S83. If SIZE is smaller than MINSIZE or larger than MAXSIZE the method is basically repeated by setting X equal to LAST in step S85 and then moving back to step S70. Thus, the method is repeated for trying to identify a (second) complete IP packet in the buffer that fulfills the size limits. However, if the size is within the limits, the identified complete IP packet (LLC PDU P(FIRST) to LLC PDU P(LAST)) is discarded in step S84. The method then ends.

Note that the first LLC PDU (P(1) if X=1) in the buffer queue is not discarded if it is possible to identify a complete IP packet in the remaining queue. The reason for this is that a first part of the IP packet, to which the first LLC PDU belongs, could already have been transmitted from the buffer. Only if it is not possibly to identify a complete IP packet in the buffer, the first LLC PDU may be discarded.

FIGS. 12A and B are flow diagrams of another embodiment of a method of managing a data buffer comprising segments (LLC PDUs) of data packets (IP packets). Steps S90 to S100 correspond to steps S70 to S80 in FIG. 11A and are not further discussed.

Figure 11B:
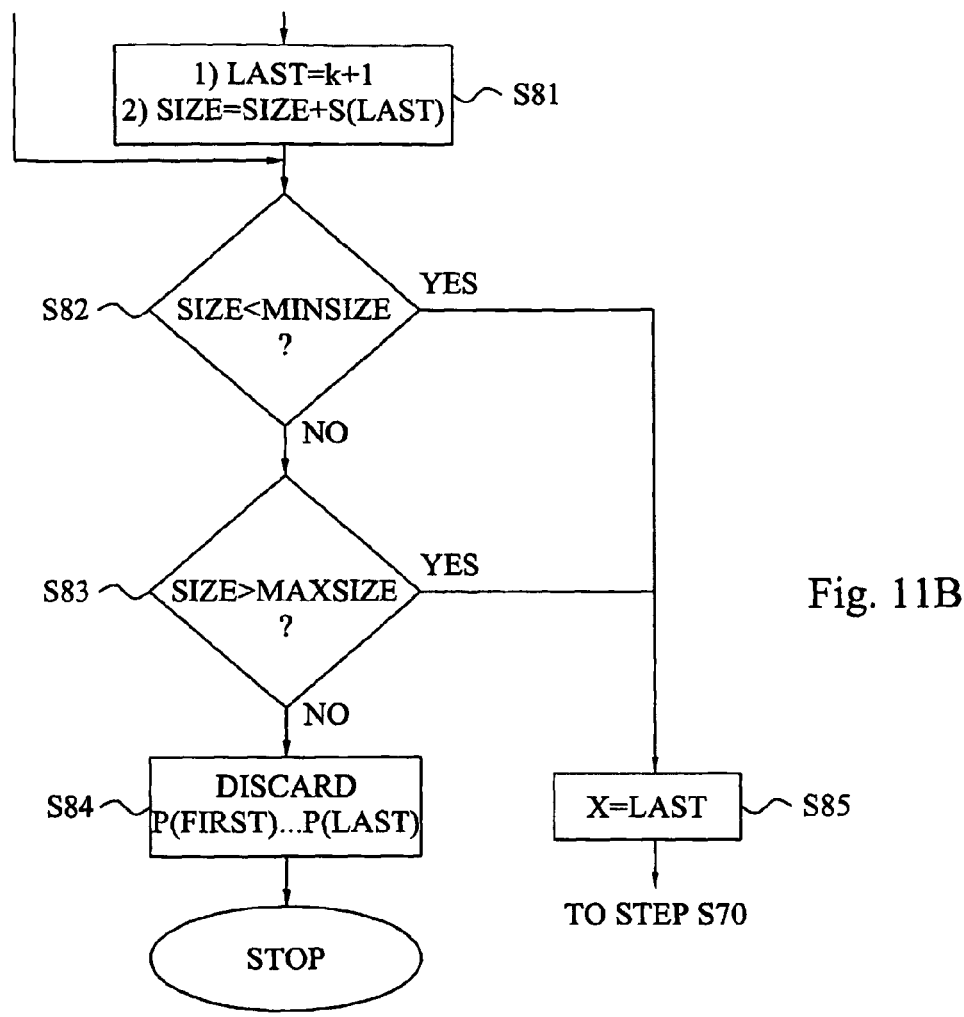

In step S99, if it is determined that the size S(k+1) of a next consecutive LLC PDU P(k+1) differs from the size S(k) of the current LLC PDU P(k). the method continuous to the size comparison of step S101. In this step S101, it is determined whether the size S(k) is smaller than the size S(k+1). If S(k) is the smallest of the two sizes S(k), S(k+1), the LAST identifier is associated with the current LLC PDU P(k), i.e. set equal to the value (or position in the buffer queue) of the segment counter k in step S103. The method then continuous to step S104. However, if S(k+1) is larger than or equal to S(k), the LAST identifier is set to k+1 (associated with the next LLC PDU P(k+1)) in step S102. In addition, the size S(LAST) of this LAST associated LLC PDU P(LAST) is added to the size parameter SIZE. The method then proceeds to step S104. The steps S104 to S107 correspond to steps S82 to S85 of FIG. 11B and are not further discussed.

FIGS. 13A and B are flow diagrams of a further embodiment of a method of managing a data buffer comprising segments (LLC PDUs) of data packets (IP packets). Similarly to the method depicted in FIGS. 11A and B, a parameter N corresponds to the total number of LLC PDUs in the buffer. A parameter MIN is the minimum size of a LLC PDU and a parameter MAX is the maximum size of an IP packet that is to be discarded from the buffer. These size thresholds are employed for discriminating between IP packets and other packets that should not be discarded.

The method starts in step S110, where a segment counter k is provided and associated with a LLC PDU P(X) in the buffer. Correspondingly, identifiers FIRST and LAST are associated with this LLC PDU P(X). A size parameter SIZE is set to the value of the size S(X) of this LLC PDU P(X). Step S111 determines whether we are looking at the last LLC PDU in the buffer, or if the accumulated size is larger than the MAX threshold value. The latter check is for making sure that we do not attempt to look for the first LLC PDU of an IP packet for longer than necessary. If the current LLC PDU P(k) is the last segment in the buffer, i.e. k equals N, or SIZE>MAX the method continues to step S122, where LLC PDU P(FIRST) to LLC PDU P(LAST) are discarded. In this case, since FIRST=LAST=X LLC PDU P(X) is discarded. The method then ends. However, if the conditions of step S111 are not fulfilled the method continues to step S112, which investigates if we are looking at the first LLC PDU of a complete IP packet. In step S112, the size S(k) of the current LLC PDU P(k) is compared to the size S(k+1) of a next consecutive LLC PDU P(k+1) in the buffer queue. In addition, the format field of this next LLC PDU P(k+1) is checked whether it is set to UI, indicating payload. The size S(k+1) is also compared to the MIN threshold value. The conditions of step S112 make sure that the first LLC PDU of the complete IP packet is selected only among those LLC PDUs of correct size (larger than MIN) and comprising IP packet payload (UI). If not (all) the conditions of step S112 are fulfilled the counter k is increased by one and the size of the updated LLC PDU P(k) that currently is associated with the counter k is added to the SIZE parameter. The loop of steps S111, S112 and S113 is then repeated until k equals N or SIZE is larger than MAX, moving to step S122, or the S(k+1) is larger than S(k) and the format FORMAT(k+1) of the next LLC PDU P(k+1) is payload UI and the size S(k+1) is larger than the MIN parameter, moving to step S114.

In step S114, identifier FIRST is associated with the identified first LLC PDU P(k+1) of the complete IP packet. i.e. set to k+1. The counter k is then increased by one and the parameter SIZE is set to the value of the size S(FIRST) of this first LLC PDU.

Thereafter, step S115 investigates if the segment counter k is equal to N, i.e. if the current LLC PDU P(k) is the last LLC PDU in the buffer or if the parameter SIZE is larger than the MAX threshold. If k is equal to N or SIZE is larger than MAX, step S120 sets the identifier LAST to the value of the counter k, i.e. being associated with the current LLC PDU P(k). The method then continues to step S121 where the complete IP packet is identified as comprising from LLC PDU P(FIRST) to LLC PDU P(LAST) in the buffer. If the current LLC PDU P(k) is not the last LLC PDU P(N) of the buffer and SIZE is smaller or equal to MAX step S115, S116 and S117 are repeated until the last LLC PDU of the complete IP packet is identified, or k=N or SIZE>MAX. Step S116 determines whether the size S(k) of the current LLC PDU P(k) is equal to the size S(k+1) of a next consecutive LLC PDU P(k+1) in the buffer queue and if the format field of this next LLC PDU P(k+1) is set to payload UI. If the sizes S(k), S(k+1) are equal and FORMAT(k+1)=UI, the counter k is increased by one in step S117. Thereafter, the size S(k) (which corresponds to S(k+1) in the previous step S116) is added to the SIZE parameter. Once S(k+1) differs from S(k) or FORMAT(k+1) is not payload UI the method continues from step S116 to step S118. This step S118 determines whether the format field of LLC PDU P(k+1) is payload. If positive, the identifier LAST is associated with this next LLC PDU P(k+1) in step S119, whereas if the format is not payload the identifier LAST is associated with the current LLC PDU P(k) in step S120. The method then continues to step S121 where the complete IP packet is identified as LLC PDU P(FIRST), LLC PDU P(LAST) and any intermediate LLC PDUs. The identified IP packet is then discarded in step S122, which then ends the method.

FIG. 14 is a schematic block diagram of a base station system (BSS) 100. The BSS 100 comprises an input and output (I/O) unit 110 adapted for conducting communication with different network nodes in the communications system housing the BSS 100 and with different mobile user equipment. The I/O unit 110 is in particular adapted for receiving LLC PDUs (data packet segments) from a SGSN node and for transmitting LLC PDUs to the relevant user equipment. The BSS 100 further includes a data buffer 120 or other storage unit for, at least temporarily, storing the LLC PDUs received from the SGSN until they, possibly, are forwarded to user equipment. The data buffer 120 is preferably configured for storing the LLC PDUs in a segment queue, where the LLC PDUs are consecutively positioned in the order they are received from the SGSN through the I/O unit 110. In a preferred embodiment all the LLC PDUs in the data queue is associated and destined for a single user's mobile appliance. In such a case, the data buffer 120 could be configured for comprising several queues of LLC PDUs, each such queue being associated with a single user or user equipment. FIG. 3 is a more detailed illustration of a data buffer 120 with a queue of consecutive LLC PDUs. The BSS 100 further includes a buffer manager or managing means 130, which manages the buffer 120, e.g. input, discard and analyze LLC PDUs.

The units 110 and 130 of the BSS 100 may be provided as software, hardware or a combination thereof. The I/O unit 110, buffer 120 and buffer manager 130 may be implemented together for example in a single base station network node of the BSS 100. Alternatively, a distributed implementation is also possible with some of the units provided in different network nodes of the base station system.

FIG. 15 is a schematic block diagram illustrating an embodiment of the buffer manager 130 of FIG. 14 in more detail. The manager 130 includes an information analyzer 132, adapted for analyzing information associated with data packet segments (LLC PDUs). In a first embodiment, the analyzer or analyzing means 132 retrieves or extracts DP information e.g. from the information field of received LLC PDUs and compares the DP information with stored identifiers for determining whether the LLC PDU associated with the DP information is a first or last LLC PDU of a complete IP packet, or an intermediate LLC PDU of the IP packet. In a second embodiment the analyzer 140 is adapted for performing size comparison of consecutive LLC PDUs in the data buffer for providing the FIRST and LAST identifiers and associating them with the correct identified LLC PDUs. In either case, the DP information (extracted from headers and/or comprising FIRST and LAST identifiers) is provided to a data packet identifier or identifying means 140 that identifies a complete IP packet in the associated buffer based on the DP information. The buffer manager 130 also comprises a segment inputter or input means 134 adapted for inputting LLC PDUs received from the SGSN node of the communications system into the associated data buffer. A data packet discarder 136 is provided in the manager 130 for discarding complete IP packets identified by the data packet identifier 140 from the data buffer. The discarder 136 could also be configured for discarding single LLC PDUs, or group of LLC PDU, e.g. if no complete IP packet is identified. The data packet discarder 136 preferably includes or has access to an Active Queue Management (AQM) protocol or unit for determining e.g. when data packets/segments should be discarded. Although not illustrated in the figure, the buffer manager 130 may include other means and units adapted for and processing complete IP packets identified in the buffer. Such additional units could include IP packet delaying and prioritizing means operating on the IP packets identified by the data packet identifier 140.

The units 132, 134, 136 and 140 of the buffer manager 130 may be provided as software, hardware or a combination thereof. The units may be implemented together for example in a single base station network node of the BSS. Alternatively, a distributed implementation is also possible with some of the units provided in different network nodes of the base station system.

FIG. 16 is a schematic block diagram illustrating an embodiment of the data packet identifier 140 of FIG. 15 in more detail. The data packet identifier 140 typically includes means 142 for storing and updating a segment counter or pointer k. This counter k is used for knowing which LLC PDU currently is being investigated during the process of identifying the first and last LLC PDU of a complete IP packet in the buffer queue. Similarly the means 142 is adapted for storing and updating the identifiers or pointers FIRST and LAST, which are associated with and used for identifying the first and last LLC PDU of a complete IP packet, respectively. This means 142 also stores and updates the size parameter SIZE, giving the size of an identified IP packet. Threshold means 144 is adapted for storing and determining the total number N of LLC PDUs in the buffer queue and different size threshold parameters, including MAXSIZE and MINSIZE, and MAX and MIN. The value of the size threshold parameters may be received from other units in the BSS or in the mobile communications system. Size comparison means or unit 146 is adapted for comparing the size of LLC PDUs in the associated data buffer, such as comparing a size of a LLC PDU currently associated with the segment counter k in means 142 with a size of a next consecutive LLC PDU in the buffer queue. Format determining means 148 is provided in the data packet identifier 140 for determining the format or type of a LLC PDU, i.e. for discriminating between those data packet segments carrying IP packet payload and other data packets or segments, including control messages and packets. In a first embodiment, the determining means 148 extracts format information from the information field in the header of received LLC PDUs. In a second embodiment, the means 148 checks the format field in the header of the LLC PDUs for determining if they contain IP packet payload. Alternatively, or in addition, the determining means 148 could base the format determination on the size of the identified IP packet or the LLC PDU, in particular by comparing the size of IP packet or LLC PDU with the size parameters managed by the means 144. In such a case, the unit 148 determines an identified complete data packet as an IP packet if its size is smaller than MAXSIZE and larger than MINSIZE. Similarly, a data packet segment of a size smaller than MIN could be determined as being a control signal packet or message, and thus containing no IP packet payload.

The units 142, 144, 146 and 148 of the data packet identifier 140 may be provided as software, hardware or a combination thereof. The units may be implemented together for example in a single base station network node of the BSS. Alternatively, a distributed implementation is also possible with some of the units provided in different network nodes of the base station system.

FIG. 17 is a schematic block diagram illustrating an embodiment of a network node 200 segmenting (IP) data packets into data packet segments (LLC PDUs). In a GPRS, EGPRS and EDGE/GPRS communications system the data packet segmenting functionality is provided in the SGSN node. The SGSN 200 includes an I/O unit 210 adapted for conducting communication with other network nodes in the communications system. The I/O unit 210 is in particular configured for receiving IP packets from the GGSN node and for transmitting LLC PDUs to the BSS. A data packet segmenter or segmenting means 220 is provided in the SGSN 200 for segmenting those received IP packets that are larger than the maximum allowed size for a LLC PDU (data packet segment). The SGSN 200 comprises a DP information associator or associating means 230 that associates DP information with the segmented data packets from the segmenter 220. The associator is preferably adapted for including the DP information, e.g. a notification whether the associated LLC PDU is a first, last or intermediate LLC PDU of a complete IP packet, in the information field of the header of the LLC PDU. The DP information associator 230 may also be configured for entering format information in the information field header of the LLC PDUs from the segmenter 220. Optional segment ciphering or encrypting means 240 may be provided for ciphering the LLC PDUs before transmission to the BSS through the I/O unit 210.

The units 210, 220, 230 and 240 of the SGSN 200 may be provided as a software-controlled computer, hardware or a combination thereof.

It will be understood a person skilled in the art that various modifications and changes may be made to what is described and that the scope of the invention is defined by the appended claims.

REFERENCES

[1] 3GPP TS 23.060 V6.1.0; 3rd Generation Partnership Project; Technical Specification Group Services and System Aspects; General Packet Radio Service (GPRS); Service description; Stage 2 (June, 2003).

[2] 3GPP TS 04.64 V8.7.0; 3rd Generation Partnership Project; Technical Specification Group Core Network; Digital cellular telecommunications system (Phase 2+); General Packet Radio Service (GPRS); Mobile Station—Serving GPRS Support Node (MS-SGSN) Logical Link Control (LLC) layer specification (December, 2001).

[3] 3GPP TS 04.65 V8.2.0; $3^{rd}$ Generation Partnership Project; Technical Specification Group Core Network; Digital cellular telecommunications system (Phase 2+); General Packet Radio Service (GPRS): Mobile Station—Serving GPRS Support Node (SGSN); Subnetwork Dependent Convergence Protocol (SNDCP) (September, 2001).

The invention claimed is:

1. A method of managing a data buffer comprising a queue of consecutive segments of data packet segments in a base station system of a mobile communications system, comprising the steps of:
said base station system comparing a size of a data packet segment with a size of a next consecutive data packet segment in said data buffer;
said base station system identifying a complete data packet comprising at least said data packet segment and said next consecutive data packet segment based on said comparison of said size of said data packet segment and said size of said next consecutive data packet segment; and
said base station system discarding said identified complete data packet from said data buffer.

2. The method according to claim 1, wherein said identifying step comprises the steps of:
identifying said next data packet segment as a first data packet segment of said complete data packet in said data buffer if said size of said data packet segment is smaller than said size of said next data packet segment; and
associating said identified first data packet segment with a first segment pointer.

3. The method according to claim 1, wherein said identifying step comprises the steps of:
identifying said next data packet segment as a last data packet segment of said complete data packet in said data buffer if said size of said data packet segment differs from said size of said next data packet segment; and
associating said identified last data packet segment with a last segment pointer.

4. The method according to claim 2, wherein said discarding step comprises the step of discarding said data packet segment associated with said first segment pointer, a data packet segment associated with a last segment pointer, and any intermediate data packet segments between said data packet segment associated with said first segment pointer and said data packet segment associated with said last segment pointer in said data buffer.

5. A system for managing a data buffer including a queue of consecutive data packet segments in a base station system of a mobile communications system, said system comprises electronic circuitry configured to:
compare a size of a data packet segment with a size of a next consecutive data packet segment in said data buffer;
identify a complete data packet comprising at least said data packet segment and said next consecutive data packet segment based on said comparison of said size of said data packet segment and said size of said next consecutive data packet segment; and
discard said identified complete data packet from said data buffer.

6. The system according to claim 5, wherein said electronic circuitry is configured to identify said next data packet segment as a first data packet of said complete data packet in said data buffer if said size of said data packet segment is smaller than said size of said next data packet segment, said system further comprises means for associating said identified first data packet segment with a first segment pointer.

7. The system according to claim 5, wherein said electronic circuitry is configured to identify said next data packet segment as a last data packet segment of said complete data packet in said data buffer if said size of said data packet segment differs from said size of said next data packet segment, said system further comprises means for associating said identified last data packet segment with a last segment pointer.

8. The system according to claim 6, wherein said electronic circuitry is configured to discard said data packet segment associated with said first segment, pointer, a data packet segment associated with a last pointer identifier, and any intermediate data packet segments between said data packet segment associated with said first segment pointer and said data packet segment associated with said last segment pointer in said data buffer.

9. A base station network node of a base station system in a mobile communications system comprising:
a data buffer comprising a queue of consecutive data packet segments; and
a system for managing said data buffer, said system comprises electronic circuitry configured to:
compare a size of a data packet segment with a size of a next consecutive data packet segment in said data buffer;
identify a complete data packet comprising at least said data packet segment and said next consecutive data packet segment based on said comparison of said size of said data packet segment and said size of said next consecutive data packet segment; and discard said identified complete data packet from said data buffer.

10. A method of enabling identification of a complete data packet comprising at least one data packet segment in a data buffer comprising a queue of consecutive data packet segments, comprising the steps of:

comparing a size of a data packet segment with a size of a next consecutive data packet segment in said data buffer; and identifying said complete data packet based on said comparison of said size of said data packet segment with a size of said next consecutive data packet segment.

11. The method according to claim 10, further comprising the step of providing a segment counter associated with a data packet segment in said data buffer.

12. The method according to claim 11, further comprising the steps of:

comparing a size of said data packet segment associated with said counter with a size of a next consecutive data packet segment in said data buffer;

identifying said next data packet segment as a first data packet segment of said complete data packet in said data buffer if said size of said data packet segment associated with said counter is smaller than said size of said next data packet segment.

13. The method according to claim 11, further comprising the steps of:

(a) comparing a size of the data packet segment currently associated with said counter with a size of a next consecutive data packet segment in said data buffer; and (b) associating said counter with said next data packet segment if said size of the data packet segment currently associated with said counter is equal to or larger than said size of said next data packet segment; and repeating both said comparison step (a) and said associating step (b) until said size of the data packet currently associated with said counter is smaller than said size of said next data packet segment, whereby said next data packet segment is identified as a first data packet segment of said complete data packet in said data buffer.

14. The method according to claim 12, further comprising the step of associating said segment counter with said first data packet segment of said complete data packet.

15. The method according to claim 14, further comprising the steps of:

comparing a size of said data packet segment associated with said counter with a size of a next consecutive data packet segment in said data buffer; and identifying said next data packet segment as a last data packet segment of said complete data packet in said data buffer if said size of said data packet segment associated with said counter differs from said size of said next data packet segment.

16. The method according to claim 15, wherein said complete data packet is identified as comprising said first data packet segment of said complete data packet, said last data packet segment of said complete data packet and any intermediate data packet segments between said first and last data packet segment of said complete data packet in said data buffer.

17. The method according to claim 15, further comprising the steps of:

determining a total size of said first data packet segment of said complete data packet, said last data packet segment of said complete data packet and any intermediate data packet segments between said first and last data packet segment of said complete data packet in said data buffer;

comparing said total size with a minimum size threshold; and identifying said complete data packet as comprising said first data packet segment of said complete data packet, said last data packet segment of said complete data packet and any intermediate data packet segments between said first and last data packet segment of said complete data packet in said data buffer if said total size is larger than said minimum size threshold.

18. The method according to claim 11, further comprising the steps of:

comparing a size of said data packet segment associated with said counter with a size of a next consecutive data packet segment in said data buffer; and identifying said next data packet segment as a last data packet segment of said complete data packet in said data buffer if said size of said data packet segment associated with said counter differs from said size of said next data packet segment.

19. The method according to claim 11, further comprising the steps of:

(c) comparing a size of the data packet segment currently associated with said counter with a size of a next consecutive data packet segment in said data buffer;

(d) associating said counter with said next data packet segment if said size of the data packet segment currently associated with said counter is equal to said size of said next data packet segment; and repeating both said comparison step (c) and said associating step (d) until said size of the data packet segment currently associated with said counter differs from said size of said next data packet segment, whereby said next data packet segment is identified as a last data packet segment of said complete data packet in said data buffer.

20. A system for enabling identification of a complete data packet comprising at least one data packet segment in a data buffer comprising a queue of consecutive data packet segments, comprising:

means for comparing a size of a data packet segment with a size of a next consecutive data packet segment in said data buffer; and means for identifying said complete data packet based on said comparison of said size of said data packet segment with said size of said next consecutive data packet segment.

21. The system according to claim 20, comprising means for associating a segment counter with a data packet segment in said data buffer.

22. The system according to claim 21, wherein said comparison means is adapted for comparing a size of said data packet segment associated with said counter with a size of a next consecutive data packet segment in said data buffer, wherein said identifying means is adapted for identifying said next data packet segment as a first data packet segment of said complete data packet in said data buffer if said size of said data packet segment associated with said counter is smaller than said size of said next data packet segment.

23. The system according to claim 21, wherein said comparison means is adapted for comparing a size of the data packet segment currently associated with said counter with a size of a next consecutive data packet segment in said data buffer, wherein said associating means is adapted for associating said counter with said next data packet segment if said size of the data packet segment currently associated with said counter is equal to or larger than said size of said next data packet segment, said comparison means is adapted for repeating said size comparison and said associating means is adapted for repeating said counter association until said size of the data packet segment currently associated with said counter is smaller than said size of said next data packet segment, whereby said identifying means is adapted for identifying said next data packet segment as a first data packet segment of said complete data packet in said data buffer.

24. The system according to claim 22, wherein said associating means is adapted for associating said segment counter with said first data packet segment of said complete data packet.

25. The system according to claim 24, wherein said comparison means is adapted for comparing a size of said data packet segment associated with said counter with a size of a next consecutive data packet segment in said data buffer, wherein said identifying means is adapted for identifying said next data packet segment as a last data packet segment of said complete data packet in said data buffer if said size of said data packet segment associated with said counter differs from said size of said next data packet segment.

26. The system according to claim 25, wherein said identifying means is adapted for identifying said complete data packet as comprising said first data packet segment of said complete data packet, said last data packet segment of said complete data packet and any intermediate data packet segments between said first and last data packet segment of said complete data packet in said data buffer.

27. The system according to claim 25, further comprising means for determining a total size of said first data packet segment of said complete data packet, said last data packet segment of said complete data packet and any intermediate data packet segments between said first and last data packet segment of said complete data packet in said data buffer, said comparison means is adapted for comparing said total size with a minimum size threshold, and said identifying means is adapted for identifying said complete data packet as comprising said first data packet segment of said complete data packet, said last data packet segment of said complete data packet and any intermediate data packet segments between said first and last data packet segment of said complete data packet in said data buffer if said total size is larger than said minimum size threshold.

28. The system according to claim 21, wherein said comparison means is adapted for comparing a size of said data packet segment associated with said counter with a size of a next consecutive data packet segment in said data buffer, wherein said identifying means is adapted for identifying said next data packet segment as a last data packet segment of said complete data packet in said data buffer if said size of said data packet segment associated with said counter differs from said size of said next data packet segment.

29. The system according to claim 21, wherein said comparison means is adapted for comparing a size of the data packet segment currently associated with said counter with a size of a next consecutive data packet segment in said data buffer, wherein said associating means is adapted for associating said counter with said next data packet segment if said size of the data packet segment currently associated with said counter is equal to said size of said next data packet segment, said comparison means is adapted for repeating said size comparison and said associating means is adapted for repeating said counter associating until said size of the data packet segment currently associated with said counter differs from said size of said next data packet segment, whereby said identifying means is adapted for identifying said next data packet segment as a last data packet segment of said complete data packet in said data buffer.

* * * * *

UNITED STATES PATENT AND TRADEMARK OFFICE
CERTIFICATE OF CORRECTION

| | | |
|---|---|---|
| PATENT NO. | : 8,130,074 B2 | |
| APPLICATION NO. | : 10/571606 | |
| DATED | : March 6, 2012 | |
| INVENTOR(S) | : Meirick et al. | |

It is certified that error appears in the above-identified patent and that said Letters Patent is hereby corrected as shown below:

In Column 1, Line 7, delete "U.S." and insert -- U.S., --, therefor.

In Column 1, Line 24, delete "(FDA)," and insert -- (PDA), --, therefor.

In Column 4, Line 42, delete "The also" and insert -- The technology also --, therefor.

In Column 6, Line 48, delete "agreement." and insert -- agreement, --, therefor.

In Column 6, Line 51, delete "Identify" and insert -- Identity --, therefor.

In Column 7, Line 12, delete "UP" and insert -- (IP --, therefor.

In Column 7, Line 57, delete "information," and insert -- information --, therefor.

In Column 8, Line 34, delete "step 23" and insert -- step S23 --, therefor.

In Column 9, Line 64, delete "P(k). the" and insert -- P(k), the --, therefor.

In Column 11, Line 49, delete "smaller then the" and insert -- smaller than the --, therefor.

In Column 12, Line 63, delete "N." and insert -- N, --, therefor.

In Column 13, Line 39, delete "P(k). the" and insert -- P(k), the --, therefor.

In Column 14, Line 32, delete "packet." and insert -- packet, --, therefor.

In Column 17, Line 43, delete "(GPRS):" and insert -- (GPRS); --, therefor.

In Column 18, Line 51, in Claim 8, delete "segment," and insert -- segment --, therefor.

Signed and Sealed this
Eleventh Day of September, 2012

David J. Kappos
*Director of the United States Patent and Trademark Office*